United States Patent
Stein et al.

(10) Patent No.: US 11,681,724 B2
(45) Date of Patent: Jun. 20, 2023

(54) INVESTIGATION TIMELINE BUILDER FOR DYNAMIC ENTITY DATA VISUALIZATIONS IN USER INTERFACES

(71) Applicant: Actimize LTD., Ra'anana (IL)

(72) Inventors: Neta Stein, Oranit (IL); Aaron Mirsky, Petah Tikva (IL); Yoram Pomer, Pardes Hana (IL); Fredi Tibi, Zoran (IL); Eli Shua, Ben Shemen (IL)

(73) Assignee: ACTIMIZE LTD., Ra'anana (IL)

( * ) Notice: Subject to any disclaimer, the term of this patent is extended or adjusted under 35 U.S.C. 154(b) by 255 days.

(21) Appl. No.: 17/208,503

(22) Filed: Mar. 22, 2021

(65) Prior Publication Data
US 2022/0300527 A1 Sep. 22, 2022

(51) Int. Cl.
*G06F 16/26* (2019.01)
*G06Q 50/26* (2012.01)
*G06F 9/451* (2018.01)
*G06F 16/901* (2019.01)

(52) U.S. Cl.
CPC ............. *G06F 16/26* (2019.01); *G06F 9/451* (2018.02); *G06F 16/9024* (2019.01); *G06Q 50/265* (2013.01)

(58) Field of Classification Search
CPC ...... G06F 16/26; G06F 9/451; G06F 16/9024; G06Q 50/265
See application file for complete search history.

(56) References Cited

U.S. PATENT DOCUMENTS

2022/0172211 A1* 6/2022 Muthuswamy ..... G06F 16/9024

* cited by examiner

*Primary Examiner* — Andrey Belousov
(74) *Attorney, Agent, or Firm* — Haynes and Boone, LLP

(57) ABSTRACT

A system is provided for a data investigation system that is adapted to provide optimized data viewing for investigations using a network topology of relations between entities. The system includes a processor and a computer readable medium operably coupled thereto, to perform operations which include receiving, from a computing device, an investigation of a first entity having a first set of attributes, determining, based on the first set of attributes, a plurality of related entities associated with a plurality of events, determining whether each of the plurality of events meets or exceeds a risk threshold for the investigation of the first entity, generating a first relations graph of the first entity to one or more of the plurality of related entities based on one or more of the plurality of events meeting or exceeding the risk threshold, and displaying, on the computing device, the first relations graph.

14 Claims, 16 Drawing Sheets

INVESTIGATION TIMELINE BUILDER FOR DYNAMIC ENTITY DATA VISUALIZATIONS IN USER INTERFACES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to dynamic data visualizations based on data relationships, and more specifically to a system and method for building a network topology having dynamic data visualizations for a data point timeline during investigation of an entity.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A networked computing system may be provided for data investigations of entities based on related entities that meet or exceed one or more risk thresholds. An entity may correspond to a person, company, organization, or another actor that may interact with one or more other entities. However, entities may also refer to objects other than actors including items (e.g., money, accounts, assets, debts, investments, or other values whether positive or negative), attributes (e.g., personally identifiable information, locations, addresses, etc.), and the like, which one or more other entities have interacted with or used. When investigating a financial crime case, or other cases that may include relationships and events occurring between entities, an investigator may require relevant investigation data to perform efficient and high-quality resolution of the case. In conventional systems, when acquiring and viewing the investigation data needed for resolving the case, the investigator may be required to move and navigate between multiple different interfaces and data processing systems. In some cases, the investigation data may not be accessible or have been properly related to the investigated entity. Having the relevant investigation data in a fast and convenient matter allows for precise and efficient case resolution.

Conventionally, the existing solutions only provide static data and data visualizations. Therefore, the investigator may be exposed to a "frozen" point in time, either the latest information regarding the investigated entity or a specific time in history for the investigated entity. Thus, the investigator may not understand how the investigation evolved and why the entity is under investigation. This process requires many data processing steps, navigations, systems, and context between data points, and therefore the desired result may not be provided. For example, under these existing solutions, even if the investigator finds partial related historical information, the investigator may miss several data sources and data relationships that the investigator may need. Thus, better investigational tools, systems, and methods are needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
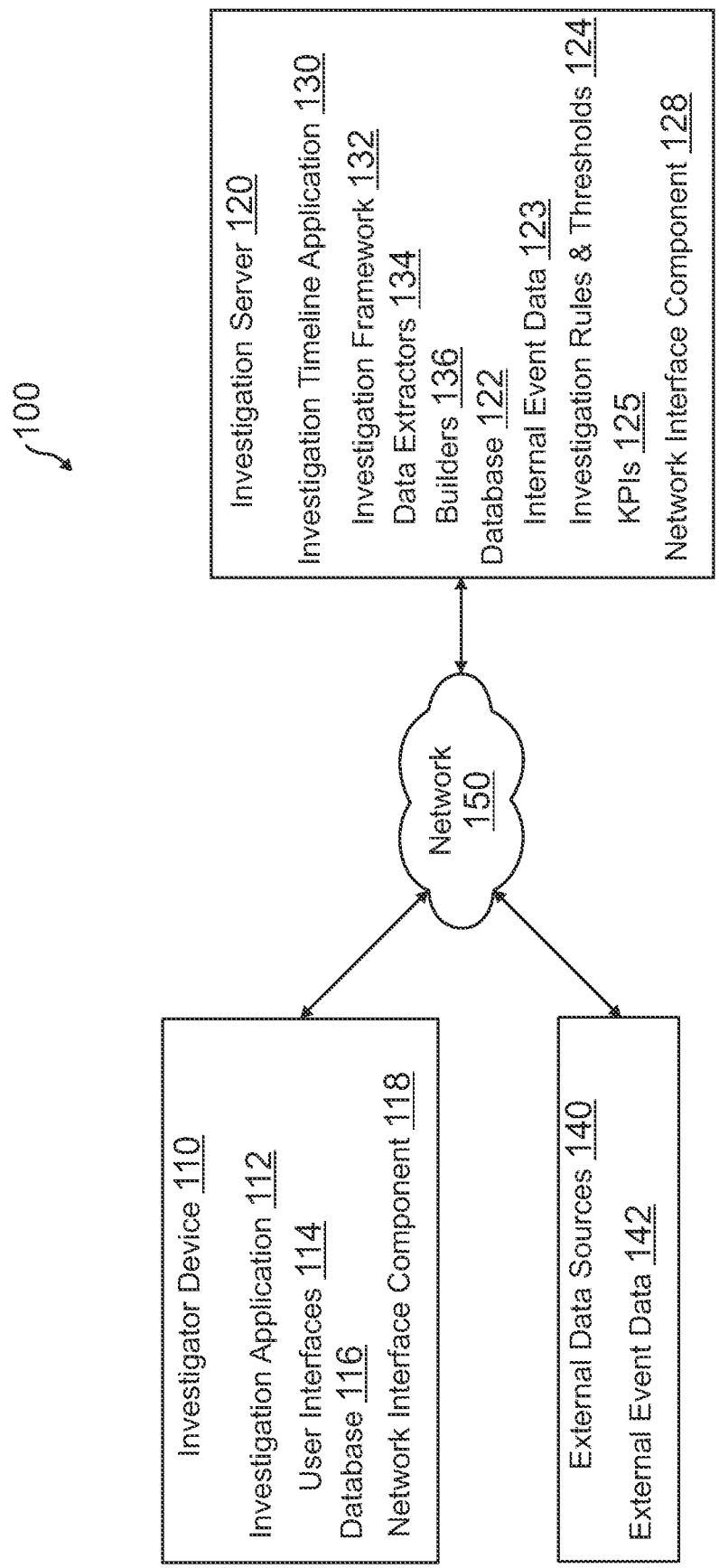
FIG. 1 is a block diagram of a networked cloud computing environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a data investigation system and framework, methods, data structures, and systems are provided for performing a data investigation of an entity based on entity and event data. An entity may correspond to an actor, such as a person, company, organization, and the like, as well as an item, attribute, location, and/or business object. A database system stores accumulated and extracted entity and event data, which may be associated with business data, previous investigations and/or evidence, relationships between entities and events, and other data that relates different entities. The data may generally correspond to investigation data and may be accumulated directly from data received by the data investigation system and/or one or more affiliated systems, such as a cloud computing system that utilizes and provides services to cloud computing tenants (e.g., workforce management, data investigation, and other services). Further, the data may be extracted and/or received from one or more external service providers, including third-party services and other external data resources that may determine entity and/or investigation data independently or in conjunction with the data investigation system.

The data investigation system may provide a data investigation framework (e.g., a system) that includes one or more user interfaces to allow for dynamic data visualizations of investigation data. The data investigation system may utilize the user interfaces to receive initial investigation input from an investigator, including at least a designation of the entity under investigation. The data investigation system may then utilize attributes for the entity to determine one or more related entities having one or more events occurring between the related entity(ies) based on the investigation data. An event may correspond to a relationship or reason why two or more entities are related at a point in time or during a time period, such as data point indicating a sale, purchase, transfer, change of personal or financial data, and the like between two or more entities. Using the data points over time, the data investigation system may determine if any events and corresponding entities meet or exceed a risk threshold at their respective time so as to cause a risk alert or otherwise correspond to a data point of interest. The data investigation system may perform this determination by calculating risk scores or values using risk rules and corresponding key performance indicators (KPIs) and comparing the risk scores to risk thresholds.

Thereafter, the data investigation system may utilize the data investigation framework (e.g., a system) to output a relations graph that includes an investigation timeline of related entities and their relationships to the investigated entity via events. This investigation timeline may be displayed as a network topology, where the investigated entity may correspond to a central node. The related entities may then be displayed by their connections to the investigated entity and other related entities. The framework may provide additional features via the framework's user interfaces, such as via a system, including an option to view entity enrichment details or additional data regarding the entity and that entity's relationship(s) to other entities. Furthermore, a timeline of data points' timestamps in an interface pane or field may be provided, such as displayed in a graphic or table representation. The investigator may use the timestamps to move to different points in time, where different entities and relationships between those entities may be shown. This may include recalculating risk alerts based on changed investigation data for that point in time.

The embodiments described herein provide methods, computer program products, and computer database systems for dynamic entity data visualizations during an investigation of an entity through a data investigation system. A data investigation system provides data investigations through dynamic entity data visualizations utilizing the computing services described herein. For example, the online system may provide a portal that is accessible by one or more end users, including investigators and the like, and is used to view an investigation timeline as a holistic view over time of a financial crime's investigation. This allows for accelerated investigation efficiency and increased investigation quality in reaching accurate conclusions, thus reducing operational costs by providing faster and more coordinated data processing, data visualizations, and data communication. Further, the user interfaces allow for simplified data displays to provide a complete picture of an investigation, as well as data points over time that allows an end user to move through those data points. When moving between historical events and other data points, the information in the user interfaces may be updated to that selected point in time allowing visualization of the evolution of the investigation. Thus, as part of providing the services to one or more end users, the online system may provide different user interface outputs that allows for dynamic visualizations of investigation data.

According to some embodiments, in a data investigation system accessible by a plurality of separate and distinct users and/or organizations, dynamic entity data visualizations are provided for an investigation timeline, thereby enhancing the experience of end users during investigations through holistic data views.

Example Environment

The system and methods of the present disclosure can include, incorporate, or operate in conjunction with or in the environment of an investigation engine, database, and portal, which may include a cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include an investigator device 110, an investigation server 120, and external data sources 140 in communication over a network 150 for data processing during data investigation of a crime by an entity using a data investigation framework or system. In other embodiments, environment 100 may not have all of the components listed and/or may have other elements instead of, or in addition to, those listed above. In some embodiments, environment 100 is an environment in which investigation data processing is provided. Investigator device 110 may be any machine or system that is used by a user to display user interfaces to request investigations of entities, as well as receive and/or display investigation timelines for the investigations having network topologies of entity nodes and relationships (e.g., events between entities). For example, investigator device 110 can be a handheld computing device, a mobile phone, a laptop computer, a notepad computer, a work station, and/or a network of computing devices. As illustrated in FIG. 1, investigator device 110 might interact via network 150 with investigation server 120 to request data from investigation server 120 and process received data for display.

Investigator device 110 may be utilized in order to request information regarding an investigation and/or entity, as well as move through an investigation timeline and entities in the timeline, through user inputs provided to an investigation timeline application 130. User input may be provided via input devices and user interfaces 114 of an investigation application 112 executed by investigator device 110. An entity referred to herein may be a person, group of people, a company, an organization and the like, but may more broadly correspond to any type of actor, item, attribute, location, and the like. In this regard, an entity may more generally correspond to a business object associated with a financial crime. The entity's unique identifier (ID) may be provided by an investigator as a user input, such as a name, address, social security number, personally identifiable information (PII), or other data that may be used to identify the entity. Thus, investigator device 110 may correspond to a device, server, and the like that interfaces with investigation server 120 to utilize the investigation services, applications, data storage, and the like of the corresponding computing environment, which may be a cloud computing environment. Investigation server 120 may receive the unique ID for the entity (or previous investigation that has been generated) and perform database lookups and data retrieval based on tracked, extracted, and/or processed entity and event data, as discuss herein. Thereafter, investigation application 112 may display the results associated with the investigation within user interfaces 114, which may include a network topology showing relationships and events between entities, as well as entity information and/or timestamps of events and entities over the timeline (e.g., from an initial date for the investigation to a certain point in time including the current time).

Investigation server 120 may be utilized by different investigators to perform data investigations of entities in order to objectively and holistically correlate entities and events over time, including those meeting or exceeding a risk threshold based on risk scores from KPIs. Investigation server 120 may accumulate and extract data for entities using investigation timeline application 130. For example, investigation timeline application 130 may include an investigation framework 132, data extractors 134, and builders 136 that may be used by investigation timeline application 130 for providing an investigation timeline of an entity when investigating a crime. Investigation framework 132 may correspond to a framework (such as a system), including an online portal and/or interface data for one or more user interfaces (e.g., user interfaces 114), which may allow an investigator to investigate an entity and view a network topology of the investigation. The network topology may correspond to a graph, visualization, or other data output that represents the entities as nodes and shows relationships between entities over time based on events occurring between the entities.

In order to build the investigation timeline, investigation timeline application 130 may use data extractors 134 and/or internal data stored to database 122. Data extractors 134 may interact with external data sources 140 in order to extract external event data 142, which may be processed to determine event and entity data by investigation timeline application 130. Data extractors 134 may extract the data in real-time or near real-time during an investigation, or prior to the investigation, to build a store of data in database 122. Database 122 may further include internal event data 123, which may include accumulated, aggregated, and/or processed data for internal interactions and information for an entity and/or event. For example, internal event data 123 may be based on cloud computing services provided to an entity. Thereafter, builders 136 may be executed with investigation data and input (e.g., an identification of an investigated entity) to process internal event data 123 and external event data 142 and provide an investigation timeline. Entities and events on the timeline, including risk alerts, may be determined and added to the timeline based on investigation rules and threshold 124 with KPIs 125. For example, KPIs 125 may be used to determine one or more risk scores for events and/or entities associated with an investigated entity (e.g., based on entity attributes), which may be compared to investigation rules and threshold 124. KPIs 125 may be based on KPI rules, as discussed in further detail herein.

Thereafter, investigation server 120 may provide the investigation timeline to investigator device 110 for output through one or more of user interfaces 114. The investigation, entities, events, and/or other data may include a network topology and/or timeline of event and entity timestamps for a relations graph of entities to each other. Investigation server 120 may further receive requests to view additional entity enrichment details, such as by selecting nodes for entities on the network topology to view information about the related entity and/or the investigated entity, as well as the events that caused the relationship between the two or more entities. A timeline of timestamps may be used to move through time for the investigation, including from an initial time for the investigation to a current time. This initial time may be any previous time, including an initial or first data point for the investigated entity or a related entity, as well as an onboarding time for the entity with a corresponding financial system for the financial crime. The list of timestamps for events may be used by the investigator to move across time during the investigation, which may dynamically change the user interface output and relations graph. If the investigator expands the nodes on the relations graph to find additional relations, more nodes may be added to the graph or may be removed from the graph, where the timestamps in the timeline may change accordingly. The list of timestamps may therefore include at least one timestamp prior to the current time of the investigation of the entity, which may be a timestamp related to another entity and event occurring in the relations graph. An exemplary user interface having this data scores is shown further in FIGS. 5A-5C.

The users of investigator device 110 and/or investigation server 120 may differ in their respective capacities, and the capacity of investigators and other end users using investigator device 110 and/or investigation server 120. These capacities might be entirely determined by applications, permissions, and profiles for a current user. For example, where an investigator is using a device to interact with investigation server 120 and view investigation timelines and relations graphs, that user system has the capacities allotted to that investigator and those computing events may be associated with an investigator. However, where an administrator or manager involved in a service provider or cloud computing system utilizes investigator device 110, that investigator device 110 has the capacities allotted to that administrator and may perform actions associated with that administrator. Thus, different users may have different capabilities, different permissions, and perform different events, with regard to investigation data processing that may be provided by investigation server 120. Both investigator device 110 and investigation server 120 may execute a web-based client that accesses a web-based application for investigation server 120, or may utilize a rich client, such as a dedicated resident application, to access investigation server 120.

Investigator device 110 may also typically utilize one or more user interface devices, such as a keyboard, mouse, trackball, touch pad, touch screen, pen and the like, for interacting with a graphical user interface (GUI) (e.g., one or more of user interfaces 114) provided by an application or browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the investigation server 120 or other systems or servers through the web-based or rich client. For example, the user interface device can be used to access data and applications hosted by investigation server 120, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN and the like.

Investigator device 110 might communicate via a network interface component 118 with investigation server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Similarly, investigation server 120 may communicate with one or more other computing devices, servers, or other online services, including investigator device 110 and external data sources 140, via a network interface component 128 using the same or similar Internet protocols. In an example where HTTP/HTTPS is used, investigator device 110 might include an HTTP/HTTPS client commonly referred to as a "browser" for sending and receiving HTTP//HTTPS messages to and from an HTTP//HTTPS server, such as investigation server 120. Such an HTTP/HTTPS server might be implemented as the sole network interface between investigator device 110, investigation server 120, and/or external data sources 140, but other techniques might be used as well or instead. In some implementations, the interface between investigator device 110, investigation server 120, and/or external data sources 140 includes load sharing functionality.

Investigator device 110, investigation server 120, and/or external data sources 140 may utilize network 150 to communicate with each other, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, investigation server 120 is configured to provide webpages, forms, applications, data, and media content to investigator device 110 and/or to receive data from investigator device 110, including investigation timelines, relations graphs, and/or network topologies. As such, investigation server 120 provides security mechanisms to keep data secure. Additionally, the term "system" is meant to include a computer system and/or server(s), including processing hardware and process space(s), and an associated storage system and database application (e.g., object-oriented data base management system (OODBMS) or relational database management system (RDBMS)). It should also be understood that "server system" and "system" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, investigation application 112 of investigator device 110, shown in FIG. 1, may correspond to the applications and API services that provide user interfaces 114 (web browser, desktop application, etc.) for an investigator (e.g., an organization and/or member of the organization including law enforcement, financial crime investigators, and the like) to interact with investigation server 120. Investigation server 120 may execute investigation timeline application 130 to interact with investigation application 112. For example, in one embodiment, investigation server 120 includes application servers configured to implement and execute software applications as well as provide related data, code, forms, webpages, and other information associated with investigation timeline application 130, and to store to, and retrieve from, a database system related data, objects, and web page content associated with investigation timeline application 130. For example, investigation server 120 may implement various functions of investigation timeline application 130, and the processing space for executing system processes, such as running applications as part of investigation timeline application 130. Additional processes that may execute on investigation server 120 include database indexing processes associated with entities and/or investigations received from investigator device 110.

Several elements in the system shown in FIG. 1 include elements that are explained briefly here. For example, investigator device 110 could include a desktop personal computer, workstation, laptop, notepad computer, PDA, cell phone, or any wireless access protocol (WAP) enabled device or any other computing device capable of interfacing directly or indirectly to the Internet or other network connection. Investigator device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, and the like. According to one embodiment, each of investigator device 110 and/or investigation server 120 and all of its components are configurable using applications including computer code run using one or more central processing unit such as an Intel Pentium® processor and the like. Similarly, investigation server 120 and all of their components might be operator configurable using application(s) including computer code to run using a central processing unit, which may include an Intel Pentium® processor and the like, and/or multiple processor units. In this regard, investigation server 120 may be performed by a greater number of devices and/or servers to form a cloud-based environment to provide online services to cloud computing tenants through cloud computing and cloud-based service delivery. This cloud computing environment therefore may provide and/or improve data processing, storage, and retrieval through networked servers and devices forming the cloud computing environment. A computer program product embodiment includes a machine-readable storage medium (or media) having instructions stored thereon/in which can be used to program a computer to perform any of the processes of the embodiments described herein utilizing one or more computing devices.

Computer code for operating and configuring investigator device 110 and/or investigation server 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 of investigator device 110 and/or database 122 of investigation server 120, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, database 116 and/or database 122 may store application and system data associated with providing and administering investigation application 112 and/or investigation timeline application 130, respectively. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Cloud Computing Environment

Figure 2:
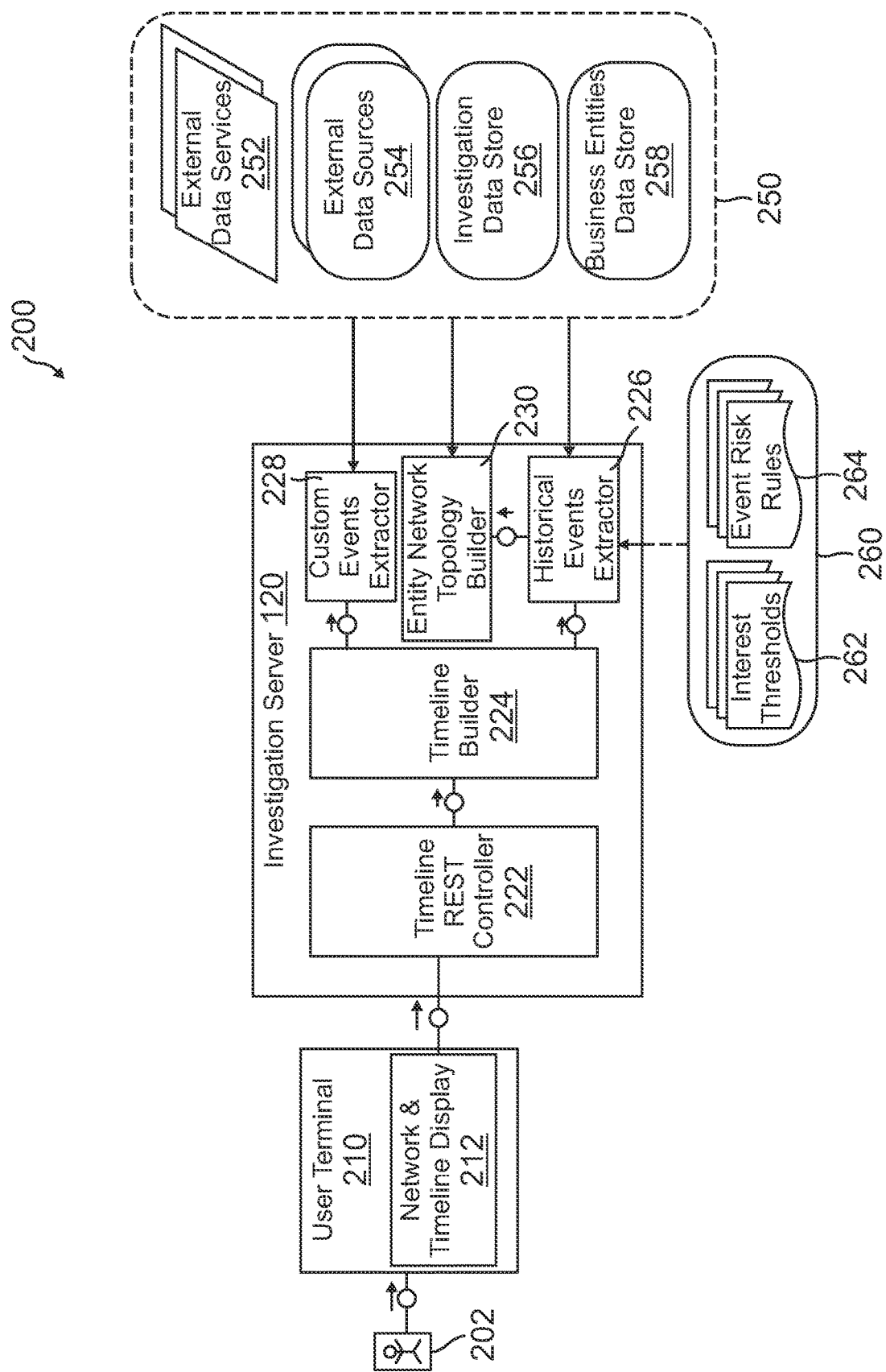
FIG. 2 is a block diagram of a data investigation system having a framework for investigating an entity based on related entities and events according to an embodiment.

FIG. 2 is a block diagram of a data investigation system having a framework for investigating an entity based on related entities and events according to an embodiment. Environment 200 of FIG. 2 includes investigation server 120 discussed in reference to environment 100 of FIG. 1. Further, environment 200 includes a user terminal, such as a computing device user by an investigator, which may correspond to investigator device 110 from environment 100. In this regard, environment 200 displays the determination of an investigation timeline for display of investigation data for an entity during an investigation of the entity.

In environment 200, to provide data during an investigation, such as an investigation timeline having a network topology of entities and events or other relations graph as an output for the investigation, an investigator 202 may utilize a user terminal 210 in order to request investigation of an entity based on available entity data and event data for relationships between entities. Thereafter, investigator 202 may view a network and timeline display 212 through an output component of user terminal 210, such as a display component having a GUI that allows for data display in application user interfaces and navigation between data. Investigator 202 may correspond to a user working on investigating a financial crime or case based on the relevant investigation data. Therefore, investigator 202 may be interacting with the network topology and using the timeline to see interesting changes in the investigation. User terminal 210 may provide the investigation details including the network topology of the related suspicious activities, related entities and enriched data. User terminal 210 may communicate with investigation server 120 to receive the timeline and time-based networks of the related entities and their data. User terminal 210 may correspond to interactive device, such as a desktop personal computer, laptop, tablet, mobile device, and/or mainframe. Network and timeline display 210 may correspond to interactive user interface displaying the network topology or another relations graph for the investigated entity including business objects selected in the relations graph and a timeline selection which changes the display of the network topology to reflect the selected points in time based on a selected timestamp on the timeline.

In further embodiments, user terminal 210 may include a JavaScript controller object that manages the nodes and edges in the relations graph along with the corresponding data and related metadata. The JavaScript controller object may be influenced by an entity timeline controller to update the displayed data to a specific point in time. The required data may be retrieved from investigation server 120 via a server communication component. User terminal 210 may include a relations graph displayed as a web object (e.g. HTML Canvas) that may visually display the investigated entity's relations graph and allow for user interactions with the relations graph. For example, investigation server 120 may return a JavaScript Object Notation (JSON) structure that includes the data points for an investigation timeline and corresponding network topology that allows for viewing of the data points, requesting entity enrichment data, and/or moving through timestamps of events and/or entities in the investigation timeline. A timeline selection user interface may also be rendered in the display and web object component to pass timeline selections to the entity timeline controller. User terminal 210 may include an entity details controller, which may correspond to a JavaScript controller where business object selections (such as entities) in the relation graph display may result in a JavaScript event being broadcast to investigation server 120. This allows for the entity details controller to listen for that event and then update the display according to the selection. Similarly, the data may be retrieved from investigation server 120 via the server communication component.

Thus, an entity details display in network and timeline display 212 may correspond to a graphical display using HTML of the data of the selected entity and corresponding relations graph and investigation timeline from investigation server 120. The entity timeline controller used for user terminal 210 may correspond to a JavaScript controller that collects and formats the data for a given entity's timeline and data points (e.g., nodes on a network topology). This data may be retrieved from investigation server 120 and passed to other components on user terminal 210. When retrieving data from investigation server 120, the server communication component may handle AJAX communication calls to investigation server 120 for the various Representational State Transfer (REST) application programming interfaces (APIs) used by the relation graph controller, entity timeline controller, and/or entity details controller.

Thus, investigation server 120 may exposes REST APIs for the data and metadata retrieval request from the different JavaScript controllers of user terminal 210. Investigation server 120 may include a timeline REST controller 222, a timeline builder 224, a historical events extractor 226, a custom events extractor 228, and an entity network topology builder 230. In this regard, timeline REST controller 222 may correspond to an entry gateway for requests made by investigator 202 for interesting points in time corresponding to the received business object identifier(s). Investigation server 120 further includes a server communication component to handle communication calls and interact with various REST APIs.

Timeline REST controller 222 for investigation server 120 may include an authentication filter to verify an incoming request and authenticate the request and investigator 202 or provide an HTTP 302 code and redirect when not authenticated. A controller call may be provided as the central Java class that manages an incoming request and verifies that a response can be provided. Further, an authorization service of timeline REST controller 222 may be used to verify that investigator 202 may be provided with access to data. This includes whether data details of the investigated entity may be provided based on the user's role within the system. If the user does not have access, a failed access check may result in an error response. This may be based on data for user's roles and permissions that define the access rights of various users or groups of users (e.g., based on business or legal roles within an organization). Timeline REST controller 222 includes a JSON converter that converts a Java result of an investigation timeline's data points and descriptions into a JSON format that may be consumed by the API caller(s) to the REST controller(s). When providing entity investigations of the corresponding data, an alert and entity data store may provide collections of investigative alerts and corresponding business entities with identifying properties in order to determine accesses to data and other data permissions.

Within investigation server 120, a timeline builder 224 may be responsible for creating a list of interesting points in time for an investigation timeline. This timeline builder 222 may interact with subcomponents to aggregate historical points in time of interest to an investigation. Timeline builder 222 may include a timeline REST controller, which serves as the entry gateway for requests made by an investigator for an investigation and interesting points in time (e.g., based on a received business object identifier). A builder class may manage the collection and assembly of the list of timeline data points (e.g., entities and corresponding events) from different data sources. The result may be a Java object list that may be returned to the timeline REST controller. After collecting timeline data points for various sources, a timeline data points merger handler may be used to merge the data points into a unified list and remove any duplicates. In order to provide this timeline and list, timeline builder 224 for investigation server 120 interacts with historical events extractor 226, custom events extractor 228, and entity network topology builder 230.

For example, historical events extractor 226 may retrieve historical data and data points related to an investigation timeline from historical network topologies or other data sources. Historical events extractor 226 may run various risk calculation rules (e.g., based on KPIs and KPI calculation rules shown in FIGS. 4A-H) on the historical data to calculate risk scores that are compared to and checked against risk threshold. The historical data and corresponding data points therefore are rated according to their weighted score. One or more highest rate risk scores may be ranked based on individual and/or aggregated threshold checks, which are returned to timeline builder 224 for entry in the investigation timeline.

Thus, timeline builder 224 may interact with historical events extractor 226. An extraction class for historical events extractor 226 may manage a collection and assembly of timeline data points from different sources of data, which may return the Java object list for timeline REST controller 222. Collected data points may be ranked by an event KPI rule processor to indicate whether data points are of interest based on KPIs for the events. This may be used with a thresholding application for holistic analysis of the risk scores with risk thresholds. Historical events extractor 226 may include an entity network topology builder, which may correspond to an extension point for custom logic to add points of interest to the investigation timeline of the entity or another business object. This may be custom predefined queries on various data sources or custom plugin code logic for lookup and determination of the timeline data points.

In order to determine an investigation timeline and build the network topology, historical events extractor 226 may include an event KPI rule processor. This processor may receive investigation data and, per event risk rule(s) (e.g., based on KPIs and corresponding risk rules), the processor may perform data collection queries followed by data analysis queries to calculate each data point's risk score and weight adjust the risk score. The risk rules may each have crafted data queries and target data sources or services for each risk rule. A risk rule data collector may act as a component to connect to the sources and/or services and executes data collection queries for the timeline data point in question using the target entity and the entity network topology as input. The resulting data results may then be used for risk score calculation using the corresponding KPIs. A rule analytical query executor may similarly connect to sources and/or services and utilize similar input to execute risk calculations. Thereafter, historical events extractor 226 may use the thresholding application to apply collected threshold rules to data points in a final decision of the data points in an investigation timeline that are of interest. For example, the scored and weighted risk scores of data points from event KPI rules processor are applied to risk thresholds. A holistic calculation may also be applied across the data points in the timeline. Thus, interest or risk thresholds correspond to how a score for a data point is judged independently or holistically. These thresholds allow for tuning, updating, and improving the corresponding investigation timeline application and builder based on requirements for one or more investigations.

Event risk rules may be used by historical events extractor 226 to determine different rule definitions for calculating a risk level or score of a particular data point in time. This includes the particular risk function and the data sources used for the data point. Event risk rules may be changed over time without requiring updating the actual underlying code and/or software, such as by deploying new risk rules to a data store. Event risk rules may correspond to KPI calculations, where exemplary KPI determinations are shown in FIGS. 4A-4H.

FIGS. 4A-4H are simplified diagram of a flowchart for determining an escalation count key performance indicator, a suspicious activity report (SAR) key performance indicator, a suspicious modification key performance indicator, a related risk key performance indicator, a risk contribution key performance indicator, a flowchart for determining a projected topology risk key performance indicator, a similar risk topologies key performance indicator, and/or a divergent transaction volume key performance indicator during investigation of an entity according to some embodiments. However, it is understood that FIGS. 4A-4H are merely exemplary KPIs that may be used in an investigation for identification of data points to add to an investigation timeline. As such, more, less, or different KPIs may also be utilized in investigations by the data investigation system described herein.

Figure 4A:
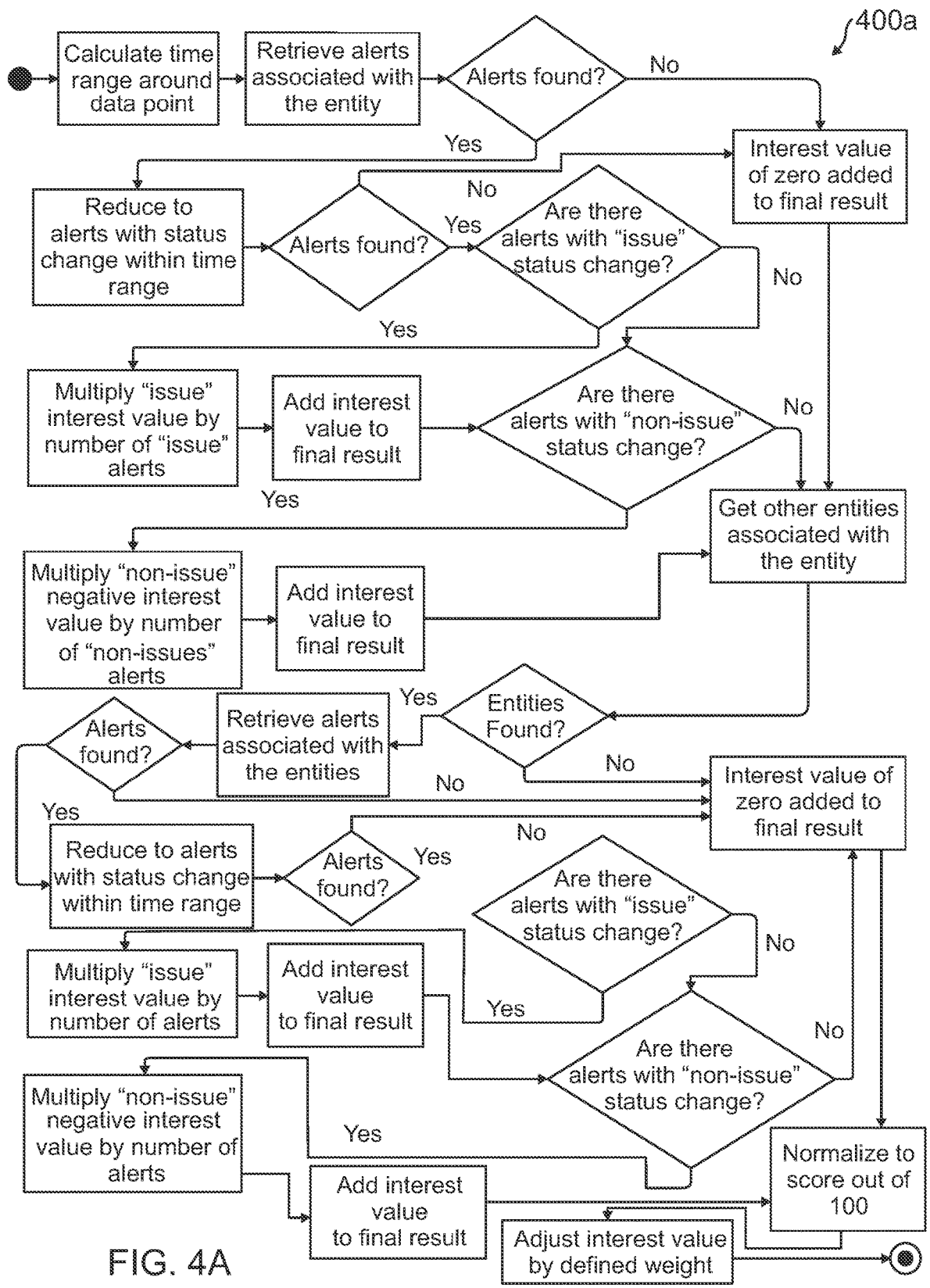
FIG. 4A is a simplified diagram of a flowchart for determining an escalation count key performance indicator during investigation of an entity according to some embodiments.
Figure 4B:
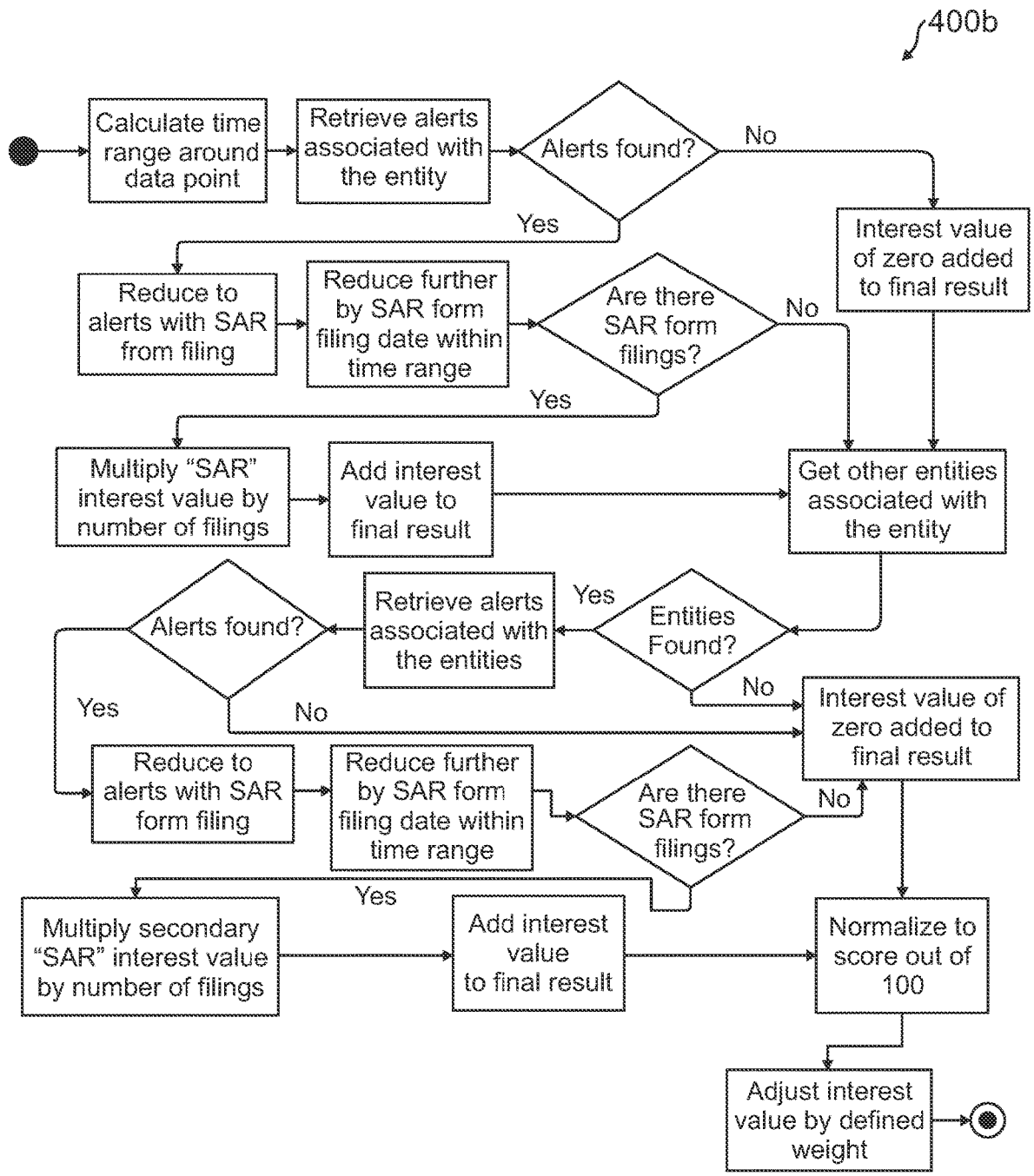
FIG. 4B is a simplified diagram of a flowchart for determining a suspicious activity report key performance indicator during investigation of an entity according to some embodiments.

In this regard, in FIG. 4A, a flowchart 400a for determination of an escalation count KPI is shown. The escalation count KPI determination in flowchart 400a may correspond to a number of alerts associated with the investigated entity that were escalated as an "issue" or instead were closed as a "non-issue" at the corresponding data point in the entity's investigation timeline. This may also include directly related entities (e.g., those directly linked from an event and/or relationship, as well as those related with a set number of degrees of separation) that have alerts that were escalated as an "issue" or were closed as a "non-issue." In FIG. 4B, a flowchart 400b for determination of SAR KPI is shown. The SAR KPI determination in flowchart 400b may correspond to a number of suspicious activity reports generated to one or more authorities (e.g., law enforcement, financial crime units, fraud detection and/or resolution units, and the like), as well as those alerts associated with related entities.

Figure 4C:
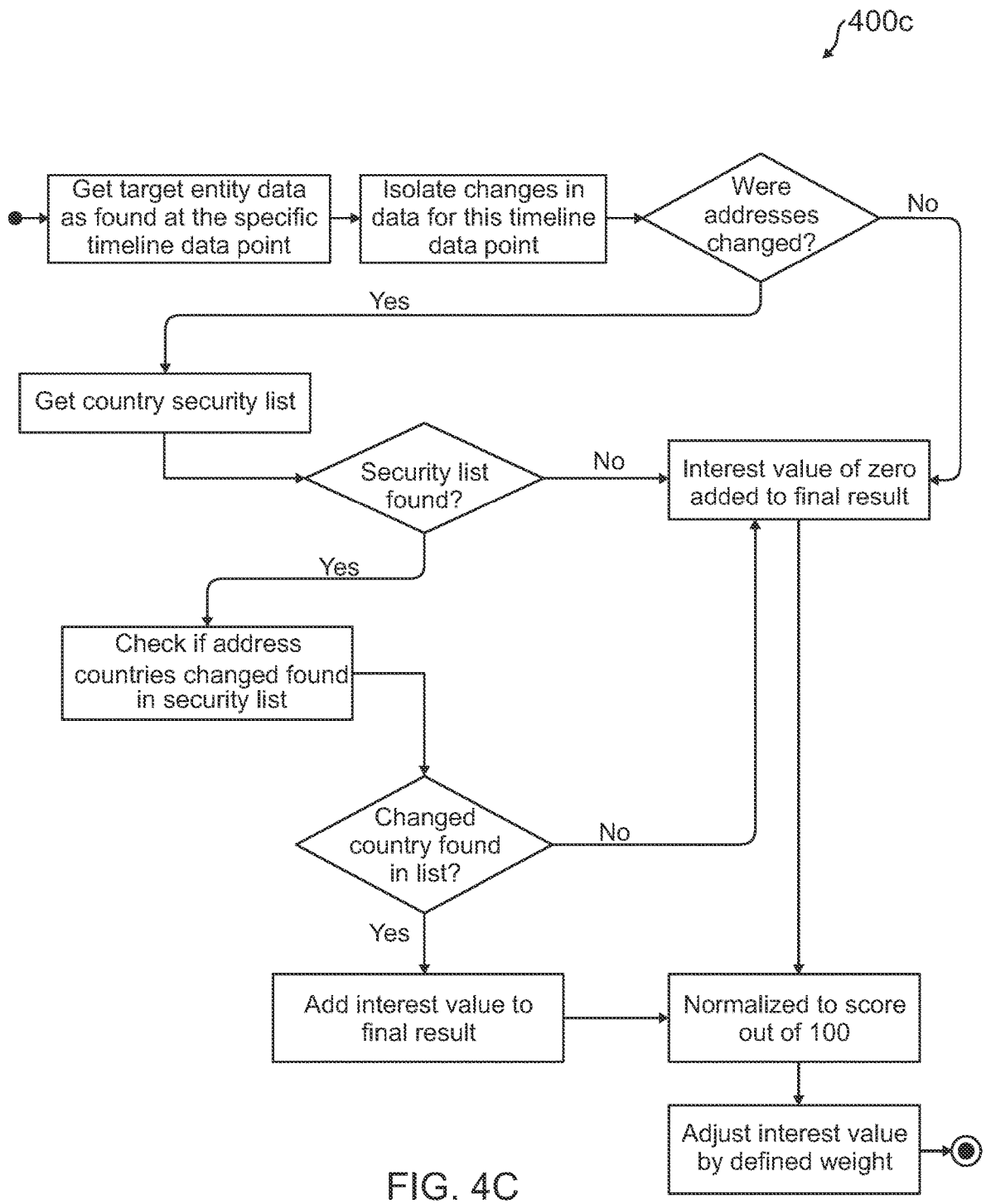
FIG. 4C is a simplified diagram of a flowchart for determining a suspicious modification key performance indicator during investigation of an entity according to some embodiments.
Figure 4D:
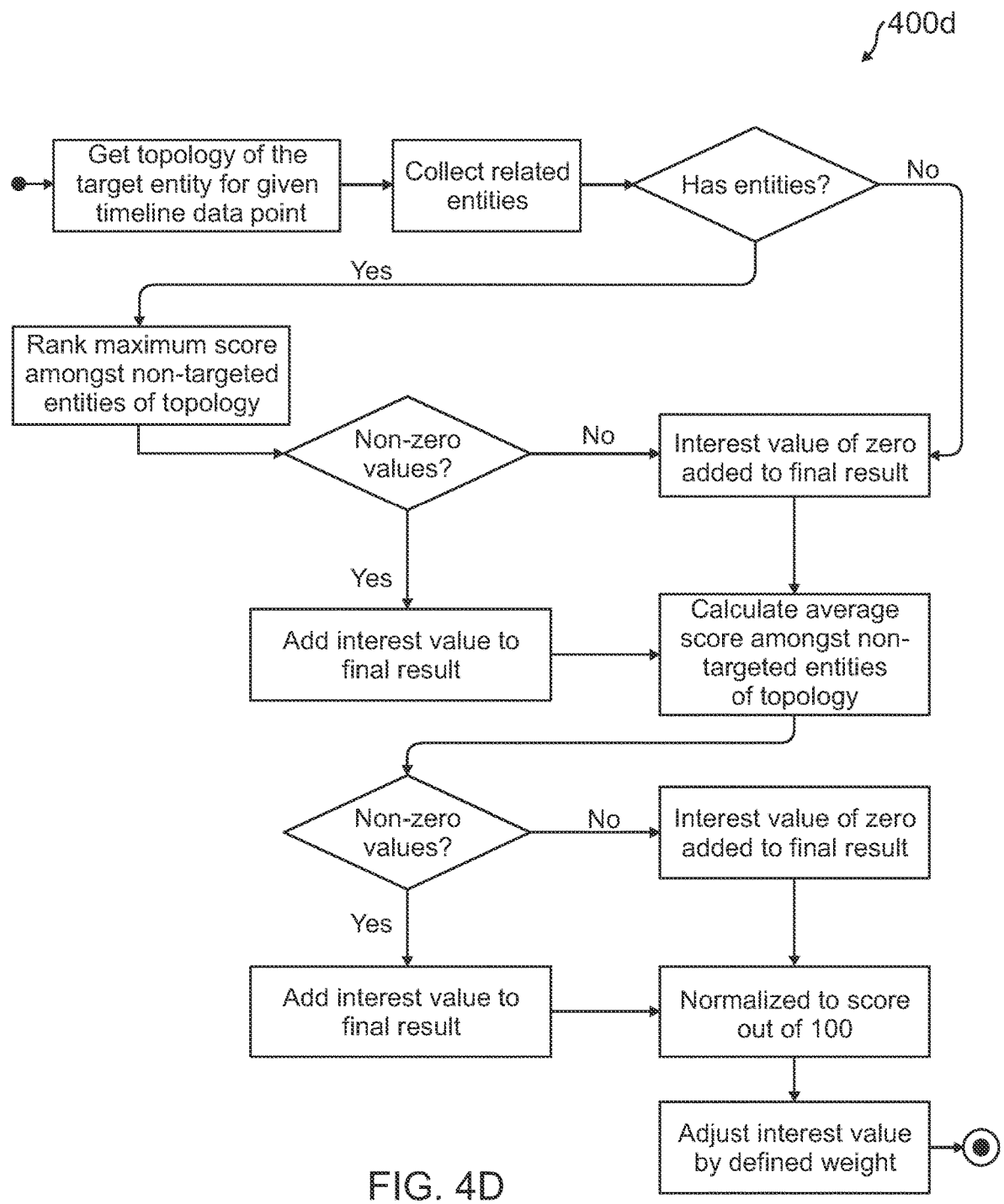
FIG. 4D is a simplified diagram of a flowchart for determining a related risk key performance indicator during investigation of an entity according to some embodiments.
Figure 4E:
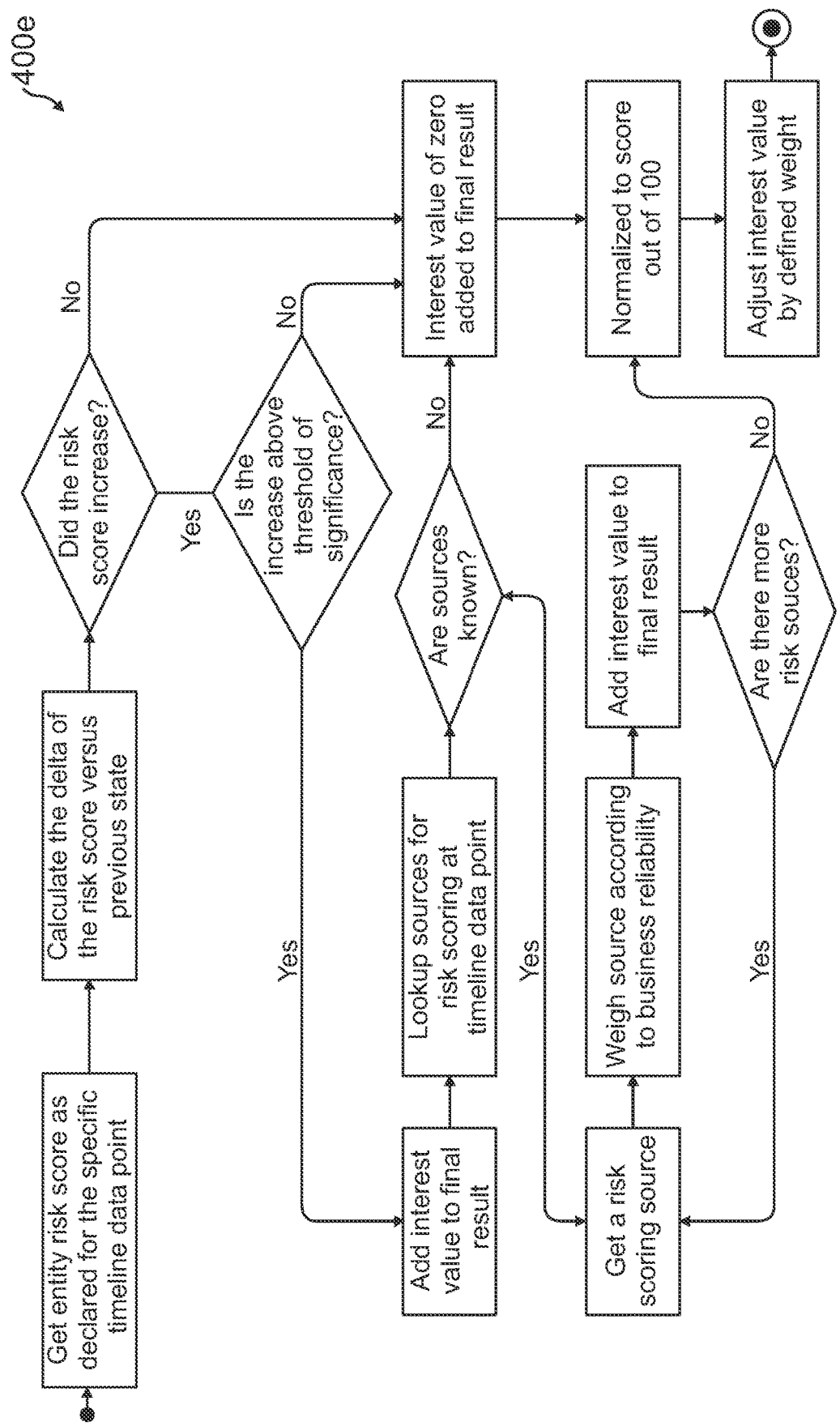
FIG. 4E is a simplified diagram of a flowchart for determining a risk contribution key performance indicator during investigation of an entity according to some embodiments.

In FIG. 4C, a flowchart 400c for determination of suspicious modification of data or other user and/or financial data is shown. The suspicious modification KPI determination in flowchart 400c may correspond to a score based on the updates to the entity's information, such as address change to a list of countries labeled as a security risk and the like. In FIG. 4D, a flowchart 400d for determination of a related risk KPI is shown, which may correspond to a maximum or average risk score between related entities and/or based on events between the entities that are above a threshold for interest for an investigation (e.g., causing a risk alert). In FIG. 4E, a flowchart 400e for determination of a risk contribution KPI is shown. The risk contribution KPI in flowchart 400e may correspond to a delta or change in an entity's increase in risk scores and scoring for a point in time, as well as a contribution of different data sources to a calculated risk score for that point in time. This may include particular scores maintained by a cloud computing system associated with investigation server 120, as well as other risk scores including customer due diligence (CDD), alert transaction monitoring, and the like.

Figure 4F:
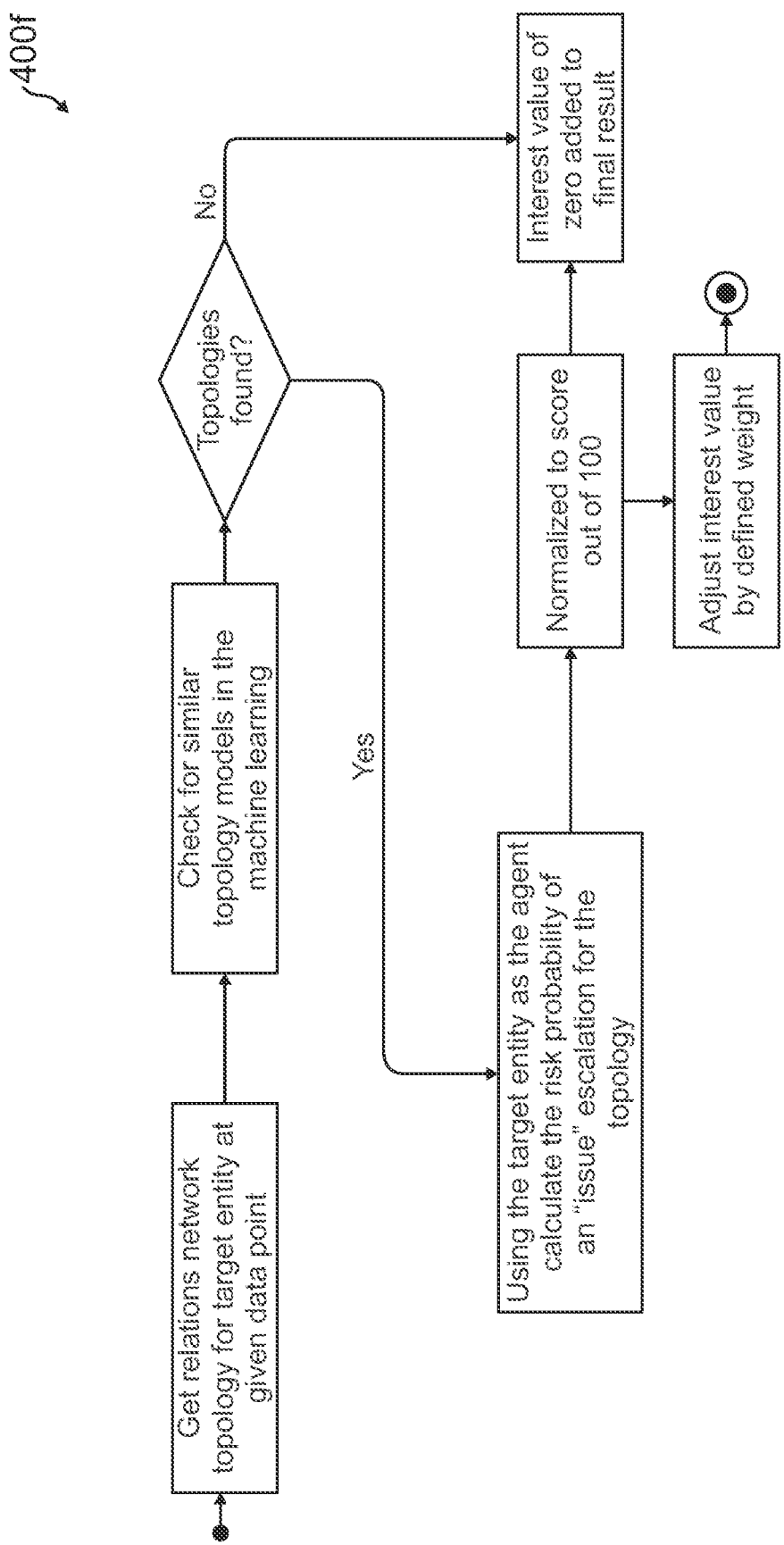
FIG. 4F is a simplified diagram of a flowchart for determining a projected topology risk key performance indicator during investigation of an entity according to some embodiments.
Figure 4G:
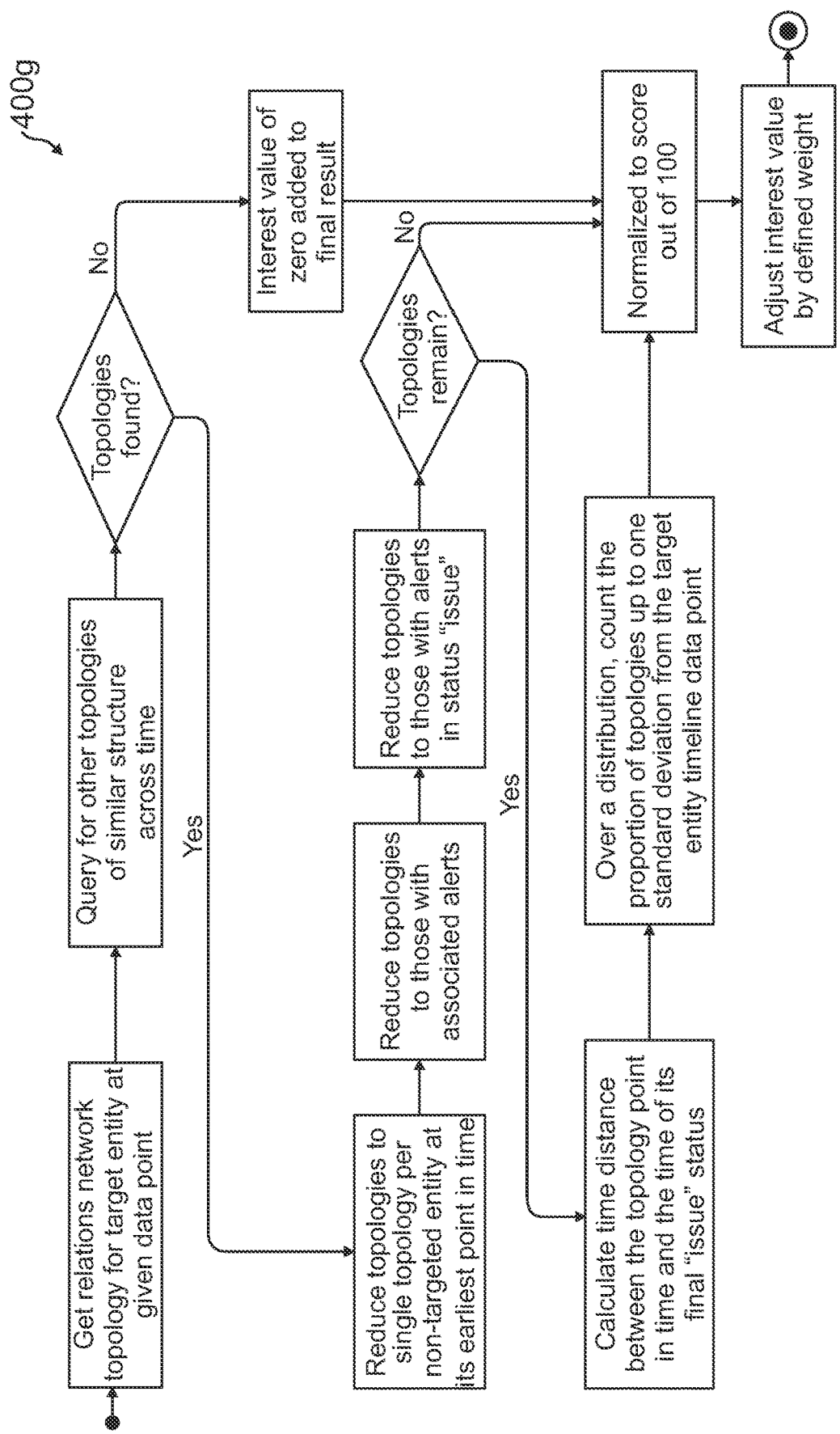
FIG. 4G is a simplified diagram of a flowchart for determining a similar risk topologies key performance indicator during investigation of an entity according to some embodiments.
Figure 4H:
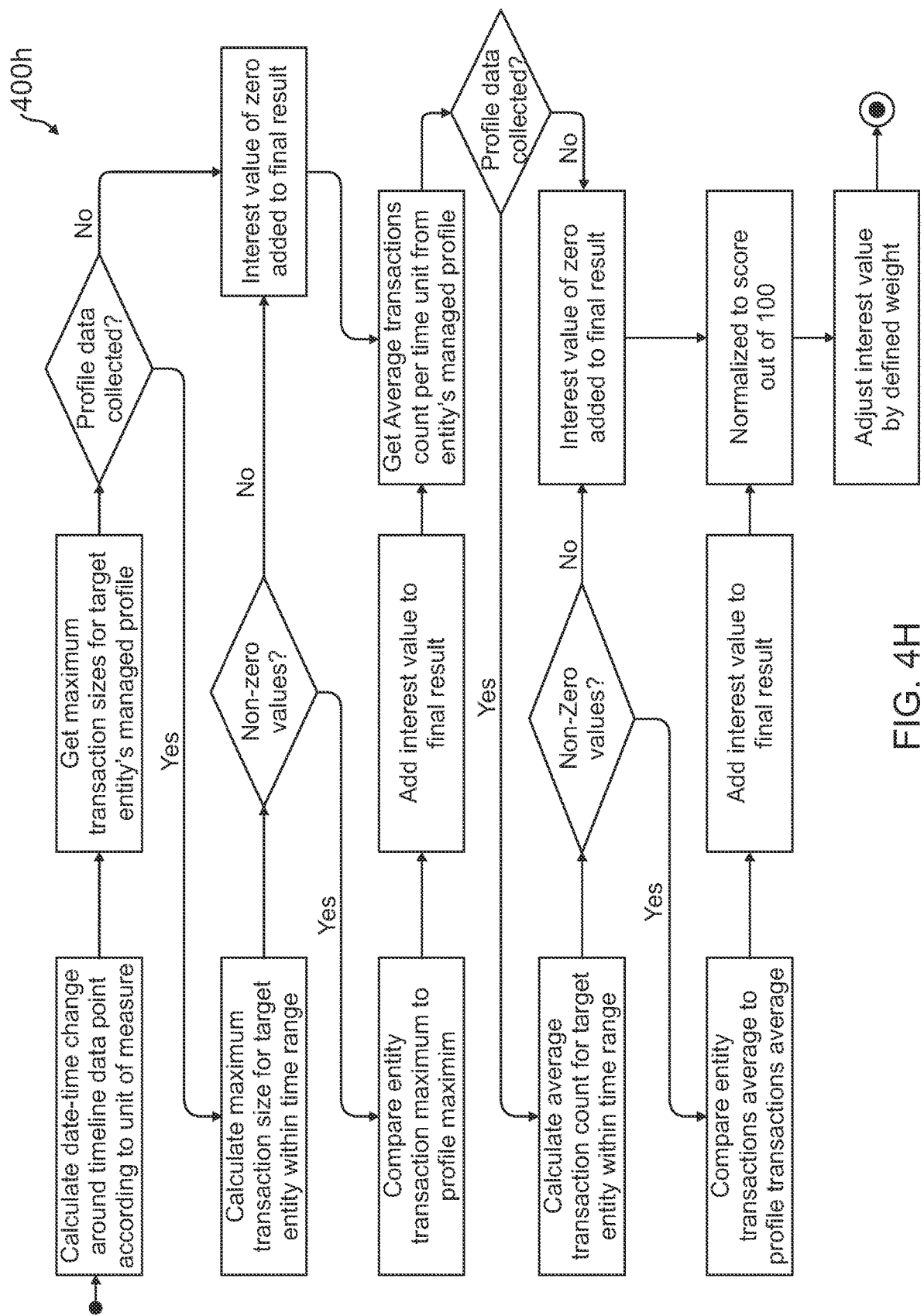
FIG. 4H is a simplified diagram of a flowchart for determining a divergent transaction volume key performance indicator during investigation of an entity according to some embodiments.

In FIG. 4F, a flowchart 400f for determination of a projected topology risk KPI is shown, where the projected topology risk KPI in flowchart 400f may correspond to risk score for an entity or other the business object's network topology for an investigation timeline at a specific point in time. For example, this risk score may be based on machine learning models of other similar network topologies that include at least a portion of the topology that have events and/or entities (e.g., data points) that have reached an "issue" state (e.g., a risk alert). In FIG. 4G, a flowchart 400g for determination of a similar risk topologies KPI is shown. A similar risk topologies KPI in flowchart 400g may correspond to risk scoring from machine learning models based on similar network topologies at points in time. This may be similar to a projected topology risk KPI but does not necessary require an "issue" state was reached for particular data points. In FIG. 4H, a flowchart 400h for determination of a divergent transaction volume (e.g., in investigation of a financial crime) is shown. Divergent transaction volume KPI in flowchart 400h may correspond to a number of transaction volumes (e.g., number of transactions) or sizes (e.g., transaction cost) that may divergent from a common behavior of the associated entity under investigation.

The data used for the KPI calculations in FIGS. 4A-4H from the rules shown in flowcharts 400a-400h may be collected from internal and external sources. These may correspond to a collection of data sources used for the analysis of timeline data points. Internal sources may correspond to the applications storing investigative and/or entity data, or data sources and services owned or operated by an organization and/or service corresponding to investigation server 120. External sources and/or services may be those that are available outside the network and linked to the network for data extraction.

Returning to FIG. 2, investigation server 120 further includes custom events extractor 228, which acts as an extension point for custom computing logic that adds additional points of interest to an investigation time timeline of the investigated entity. This may include custom predefined queries on various data sources or custom plugin code logic for lookup and decisioning of the additional timeline data points to add to an investigation timeline. In this regard, custom events extractor 228 may interface with timeline builder 224 and may include an extraction class to manage the collection and assembly of a list of timeline data points from different sources. The resulting list may correspond to a Java object list that may be returned to timeline REST controller 222. Custom events extractor 228 may utilize custom event queries, which may correspond to data queries and service calls for an application database. The queries may further include metadata for the query and a corresponding API, the input parameters, and returned output data structures that may be read by a system. These results may be standardized into a Java class type within the corresponding application.

Custom events extractor 228 may include an entity events plugin executor that may execute blocks of custom code for the corresponding business logic to find data points of interest for an investigation timeline. The plugins may be previously installed and stored with an application, which may utilize internal and/or external data sources and/or services via the plugins. In this regard, custom event plugins used by custom events extractor 228 may correspond to a store of instantiated Java plugins for a Java interface, which enables execution of and inputs to the plugins, as well as return of data objects for an investigation timeline. Thus, custom events extractor 228 may interact through these plugins with the internal and/or external sources and/or services for data.

Investigation server 120 further includes entity network topology builder 230, which may then build the various network topologies based on investigation timelines for the target entity under investigation based on historical events extractor 226 and/or custom events extractor 228. This may perform lookup of standalone data events and entities associated with the investigated entity, where timeline events and/or related entities may be determined based on those of high enough importance to be considered for inclusion in the investigation timeline. Entity network topology builder 230 may utilize one or more algorithms to create a network topology for each investigation point of time based on a network topologies overall risk from a dynamic list of KPIs determined using flowcharts 400a-400h. For example, a number of alerts that were escalated as an "issue" or were closed as a "non-issue," a number of SARs generated to an authority, a score based on a nature of an entity's updates to information, a maximum or average risk score of an event involving entities, and the like may correspond to KPI factors for the algorithm.

Reports or alerts escalated to an "issue" may be those identifiers provided by a reviewing authority that indicates there as a risk assessment of a transaction or interaction that did not comply with one or more risk rules and/or risk assessment models. For example, an intelligent risk assessment system may employ one or more artificial intelligence or machine learning models to assess risk in a transaction. Utilizing such models, the system may identify a particular transaction or action by a user as exceeding a tolerable amount of risk, such as based on transaction amount, parties, locations, and the like. In such instances, an "issue" flag may be raised. However, if the transaction is not risky, or is flagged but does not exceed the tolerable risk, the transaction may not be raised as an issue, and therefore the transaction may be closed as a "non-issue." Furthermore, the flags for an "issue" or "non-issue" may be presented by a reviewing authority when analyzing a particular data point. For example, a reviewing authority may review flagged data for a data point of an entity and may either raise the data point as being an "issue" or a "non-issue" based on assessment of the underlying data. The algorithm may consider the KPIs and calculate a network snapshot score for the corresponding data point, which may use a set of weights for the measurements. This score is then compared to a risk threshold for inclusion of the data point in an investigation time.

Once data points are extracted by historical events extractor 226 and/or custom events extractor 228, the data points are determined for the investigation timeline by entity network topology builder 230. Entity network topology builder 230 may include a builder class, which may correspond to a Java class responsible for collecting the list of timeline data points for the investigated entity based on queries into the internal application data stores. This builder class may interact with an entity events collector that may execute a search for timeline data points of potential interest for the investigated entity. The search may be based on the queries and may results in a final set of candidate data points and their corresponding descriptive data. Entity network topology builder 230 may include predefined and stored search queries, which allow for updating of the application without requiring software updates due to code changes. Entity network topology builder 230 then may receive relationships (e.g., events between entities), identify alerts, and build a list of topological data points for the investigated entity in a network topology. A change in the network topology and/or state of a node (e.g., entity) may result in a separate network topology data point in the timeline (e.g., by splitting off or removing). In this regard, criteria for determining a new version of a network topology may include a change in data for the investigated entity and/or related entities, a change in a workflow state of these entities, a change in relationship between these entities, a change in an event (e.g., alert changes), and/or a creation date of an investigation of an entity.

Environment 200 further includes data sources 250 that may be relied on by investigation server 120 for determination of entity and/or event data. For example, external data services 252 may correspond to third-party services that provide investigative information, entity data, relationships, and/or additional relevant data. External data sources 254 may correspond to other external data sources (e.g., online data resources) containing investigative information, entity data, relationships, and/or additional relevant data. Investigation data store 256 may correspond to an internal and/or external store of investigation cases known to an organization, their interrelationships, and/or their relationships to entities. Business entities data store 258 may correspond to a store of business entities known to an organization and their interrelationships.

Further, environment 200 includes threshold information 260. Threshold information 260 may correspond to available data sources having interest thresholds 262 and event risk rules 264 for use in risk scores and data points of risk or interest in an investigation. Interest threshold 262 includes threshold rules on how analyze a risk score independently or holistically (e.g., over the entire investigation) based on calculated risk scores and whether those risk scores meet a threshold risk requirement for inclusion in an investigation timeline. One or more data points in time with a highest score may be chosen for display to investigator 202. The rules may be stored as metadata, where one or more investigators and/or clients can adjust preinstalled thresholds and/or add custom thresholds. Event risk rules 264 may include different rule definitions for calculating a risk level of a data point. This may include one or more risk functions and the data sources and/or services utilized by the risk function(s). Final scores may then be adjusted by one or more weights. As the rules may also be stored as metadata, investigators and/or clients may add and/or adjust rule definitions.

Figure 3:
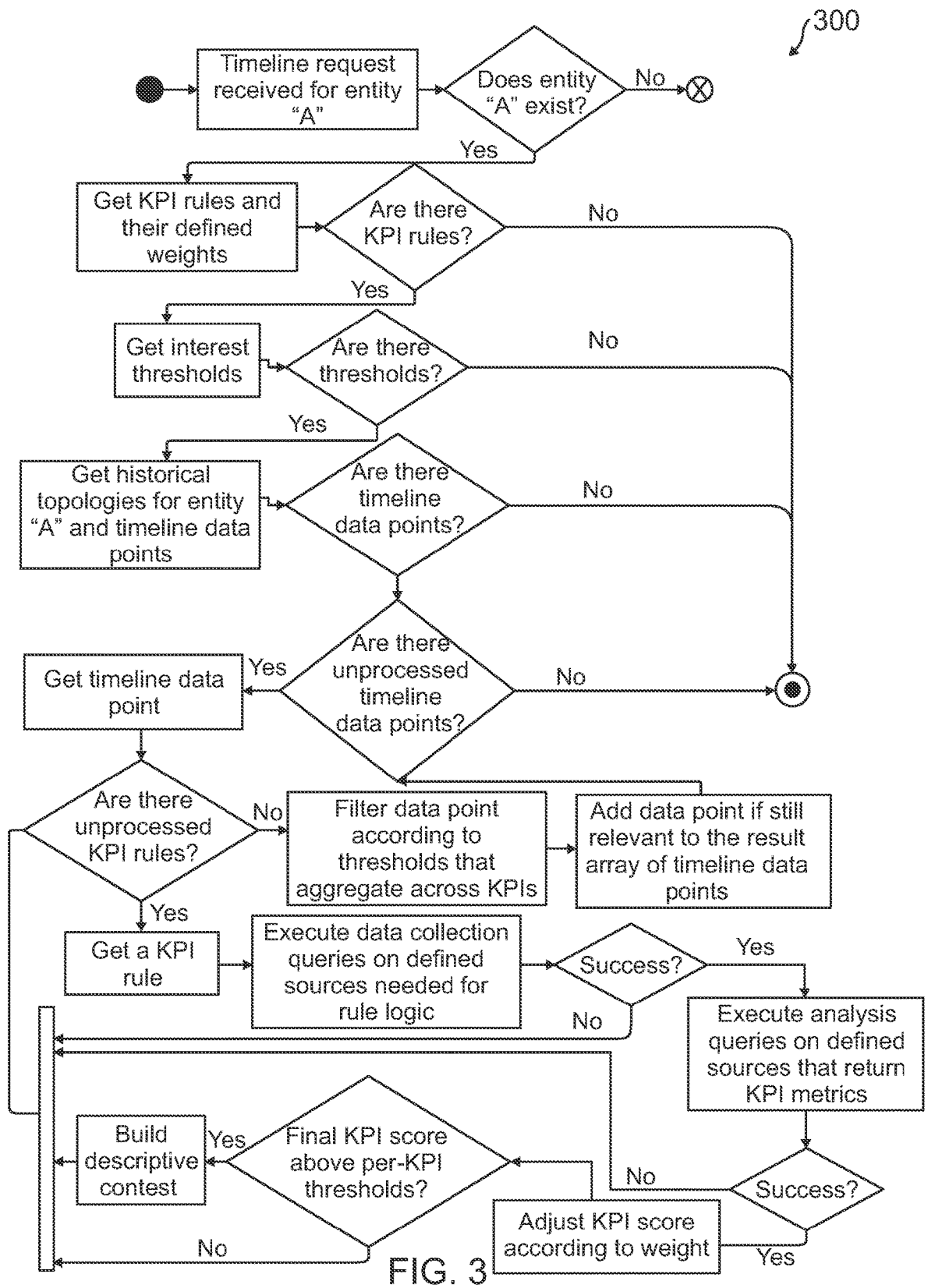
FIG. 3 is a simplified diagram of a flowchart for a logic flow to build an investigation timeline and network topology of entities and events during an investigation according to some embodiments.

FIG. 3 is a simplified diagram of a flowchart for a logic flow to build an investigation timeline and network topology of entities and events during an investigation according to some embodiments. In some embodiments, generating investigation timelines and network topologies described in flowchart 300 of FIG. 3 can be implemented and performed using investigation server 120 from environment 100 of FIG. 1. In this regard, in flowchart 300 investigation timeline server 120 may execute processing logic and code to output an investigation timeline and network topology via one or more user interfaces of investigator device 110 in environment 100.

Flowchart 300 begins at a step 1, where an investigation request is received in order to present an investigation timeline for a specific entity under investigation, which may correspond to a business object. At step 2, it is determined if the requested entity exists within the data investigation system. If so, flowchart 300 continues to the next step 3, otherwise flowchart 300 proceeds to step 23 and an error code is provided. At step 3, a defined set of KPIs and a relative weight for each KPI in an algorithm is retrieved in order to calculate a total risk or KPI value for each historical data point for the entity. For a data point, at step 4, it is determined if a KPI list exists. If not, then flowchart 300 proceeds to step 22 where no more timeline data points remain in the original list for the defined set of KPIs, and the final array for an investigation timeline (and corresponding network topology) is returned to the investigator or other data caller (e.g., a computing device). These data points may correspond to events and/or relationships between entities, such as data points of interest during an investigation each having a timestamp for an event or relationship.

However, if the KPI list still exists, at step 5, a list of individual and aggregated thresholds is retrieved, which is then used for defining which historical data points in a network topology are of most importance to the investigation of the entity. At step 6, if the list for the threshold(s) exists, flowchart 300 proceeds to step 7, however, if not, flowchart 300 proceeds to step 22 to return the investigation timeline to the data caller. At step 7, the historical topologies and their historical data points, data changes of data objects (e.g., entities and/or events) in the topology, and additional data points from external sources are retrieved. At step 8, it is determined if the list of historical topologies for which a score is calculated exists and includes timeline data points of interest. If not, flowchart 300 proceeds to step 22 to return the investigation timeline and network topology. Otherwise, flowchart 300 continues to step 9 where it is determined if there exists one or more timeline data points that are not yet evaluated by the KPI rules and corresponding thresholds. Step 9 may correspond to an iteration over the collection of timeline data points to further generate the investigation timeline and corresponding network topology. If no unprocessed data points exist, flowchart 300 proceeds to step 22 and ends by outputting the investigation timeline and network topology. However, if unprocessed data points exist, at step 10, the next timeline data point for the investigation is retrieved for processing of the corresponding data.

Flowchart 300 then proceeds to step 11 where it is determined if there are any KPI rules that have not been processed for the retrieved data point. This may be performed as an iteration over all the KPI rules for a data point until the KPI rules are exhausted. These KPI rules for determining KPI values are shown in further detail with regard to FIGS. 4A-4H. At step 12, the next KPI rule is retrieved for invocation with the timeline data point that is being processed. Using the KPI rule, a predefined data query is executed with service calls to collect the information needed for a risk value calculation of the data point (e.g., based on the KPI rule), at step 13. If the information for the data point is successfully retrieved, at step 14, an analysis of the information using the KPI rule is performed. However, if the data retrieval fails or there is no data, flowchart 300 proceeds to the next KPI rule at step 11. At step 15 when the information is successfully retrieved, predefined data analysis queries using the data point are executed using the retrieved information as input. This continues with any further rule logic in order to determine the KPI value for the corresponding KPI rule for the timeline's data point.

At step 16, if the queries and decision rule logic for the KPI is successfully executed, flowchart 300 proceeds with KPI value weighting based on the corresponding weights. However, if these are not executed successfully, flowchart proceeds back to step 11 to move to the next KPI rule. At step 17 after weighting of the KPI value, the KPI value is increased or decreased based on the perceived business weight of the KPI rule as compared to other KPI rules. Thereafter, at step 18, a risk or interest threshold may be defined as a stop-gap filter on an individual KPI basis. If the weighted KPI rule value satisfies the corresponding threshold(s), flowchart 300 proceeds to step 19. Otherwise, flowchart 300 returns to step 11 for the next KPI rule. At step 19, sentence templates are used to construct explanations of the corresponding KPI, which may be used to explain the KPI and/or alert to end users. Further, specific relevant data values involved in the KPI value calculation may be packaged in a JSON container for presentation to the end users. This then returns to step 11 for the next KPI rule. However, if no KPI rules still exist, at step 20, it is determined all KPI rules have been invoked on the timeline data point. These may be passed to holistic risk or interest thresholds to determine calculations across KPI values, which in turn provides an overall final determination of whether the data point is holistically in the investigation timeline due to associated risk or interest. Thereafter, if the KPI values meet or exceed the holistic threshold(s), the data point is added as a timeline data point with descriptive content to a final list of data points in the investigation timeline.

Figure 5A:
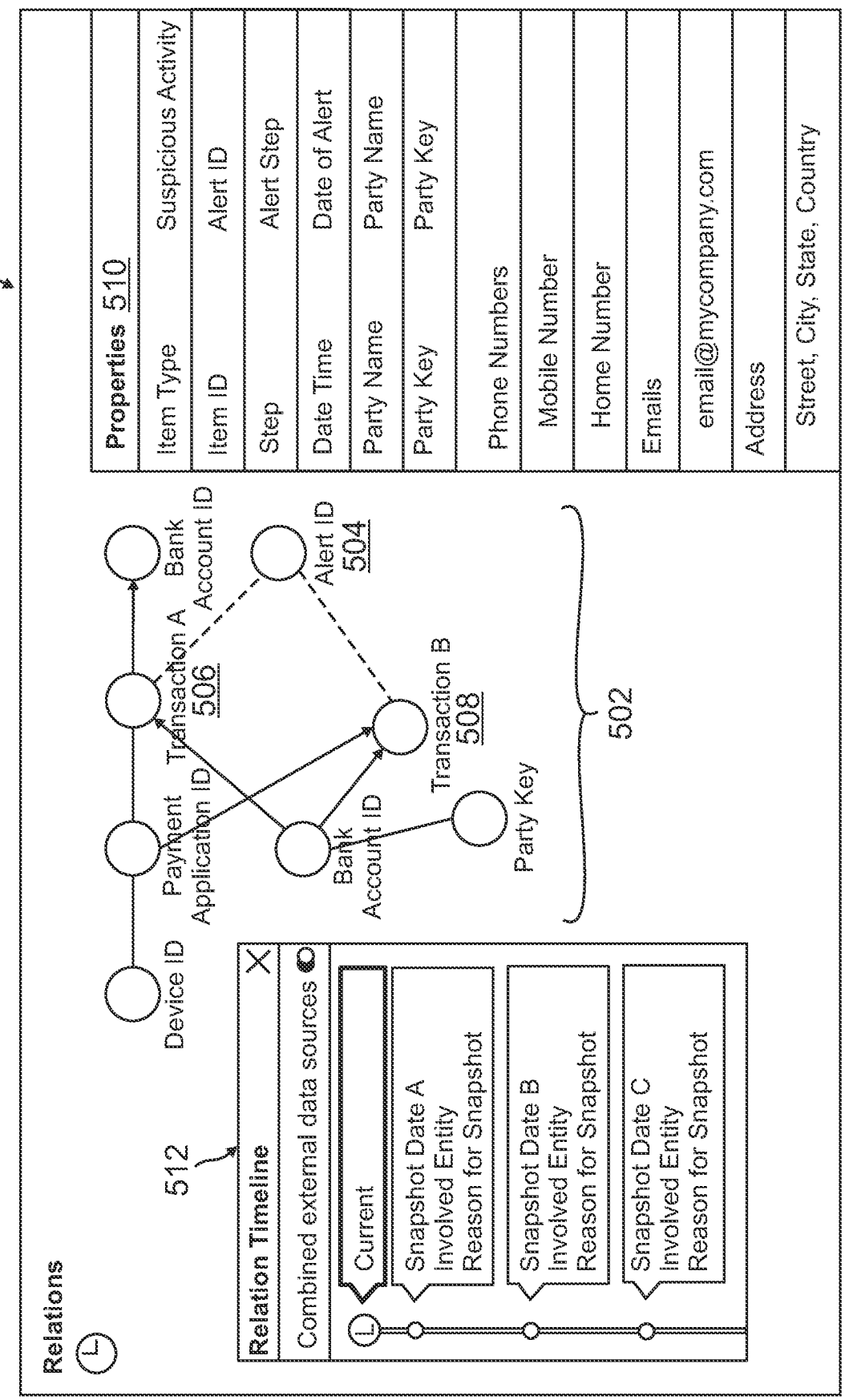
FIG. 5A is an exemplary user interface that shows an investigation timeline in an alert display according to some embodiments.

FIG. 5A is an exemplary user interface that shows an investigation timeline in an alert display according to some embodiments. Interface 500a of FIG. 5A may be displayed by a computing device during an investigation of an entity based on related entities and events that occur between those entities. Thus, interface 500a may be displayed by investigator device 110 when investigating an entity using investigation server 120.

Interface 500a displays a network topology 502 for an investigation timeline of an entity, which may be determined as described herein by investigation server 120. Once determined, a JSON structure or other container structure may be returned to investigator device 110 for output through one or more user interfaces of an application, such as a web browser or rich device application. Network topology 502 may correspond to an interactive investigation visualization as a dynamic visualization for a relations graph. Entities may be represented as circles or nodes within network topology 502, which may correspond to transaction parties, bank accounts, addresses, devices, and the like. Thus, an entity can be a person, item, attribute, or another business object. A list of entities may depend on the type of investigation. Connections between entities may be represented as lines that connect two or more entities. There may be many types of connections that correspond to events and/or relationships, such as relations between persons (e.g., family, employee, etc.), money flow, company ownership, item or property ownership, etc.

When viewing network topology 502, an alert ID 504 may correspond to an alert generated based on KPI values and determined risk scores when compared to one or more risk thresholds. Alert ID 504 further shows the relationship between a transaction A 506 and a transaction B 508 that may have caused an alert ID 504 as the connected entity nodes in network topology 502. For example, transaction A 506 and/or transaction B 508, as well as other data for an entity, may have caused alert ID 502, such as if there is a variance in transaction frequency or size. Interface 500a further includes entity enrichment details 510 for alert ID 504, which may be queried from investigation server 120 when selecting alert ID 504 and returned in interface 500a. A timeline 512 of timestamps for the investigation timeline may also be displayed in interface 500a, which may allow for movement between data points and their corresponding timestamps.

Figure 5B:
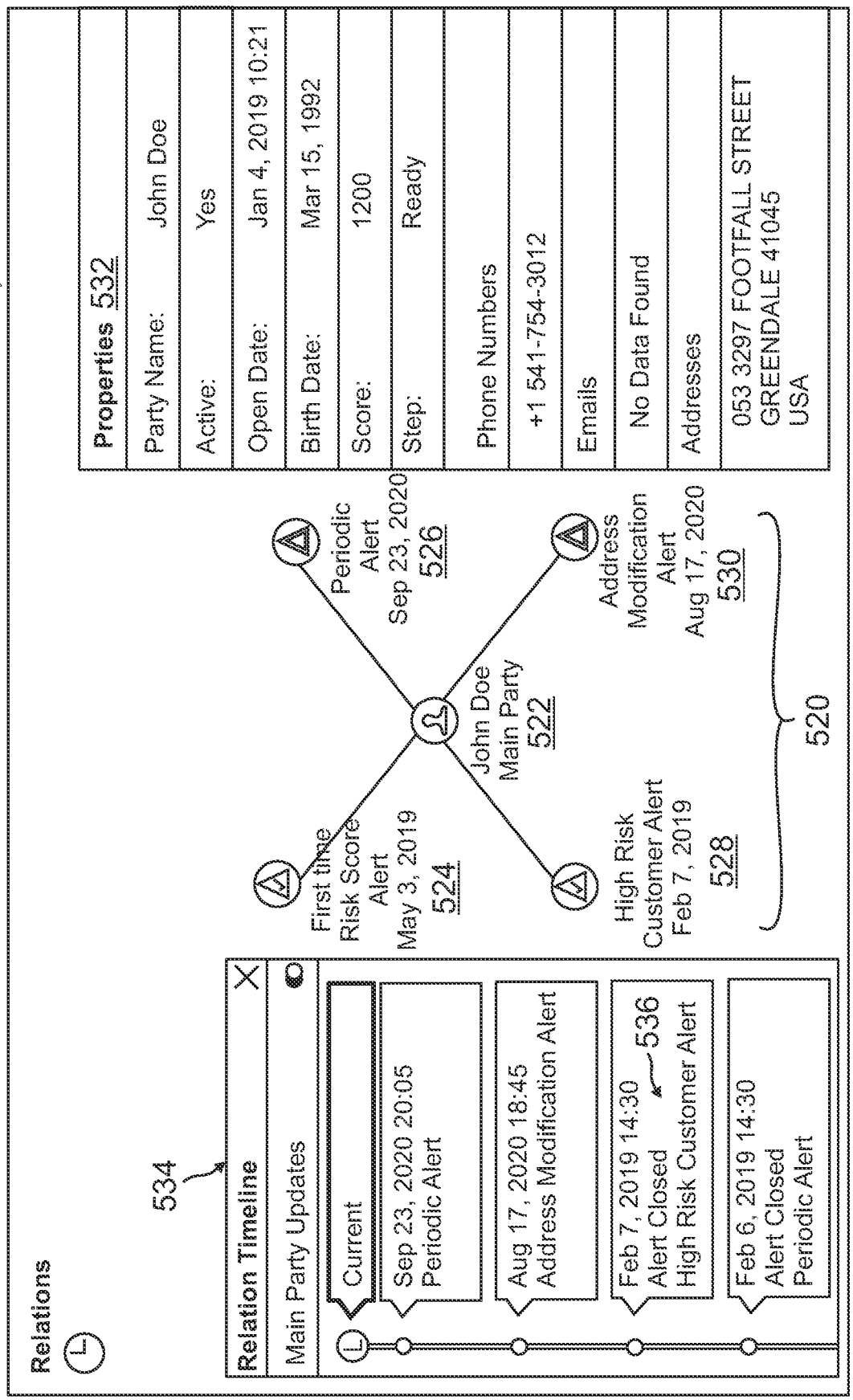
FIG. 5B is an exemplary user interface that shows an investigation timeline having a current snapshot of an investigation object according to some embodiments.

FIG. 5B is an exemplary user interface that shows an investigation timeline having a current snapshot of an investigation object according to some embodiments. Interface 500b of FIG. 5B may be displayed by a computing device during an investigation of an entity based on related entities and events that occur between those entities. Thus, interface 500b may be displayed by investigator device 110 when investigating an entity using investigation server 120.

Interface 500c displays a network topology 520 for an investigation timeline of an entity, which may be determined as described herein by investigation server 120. Network topology 520 may correspond to a change in a view of network topology 502 from FIG. 5A. In this regard, a received JSON structure or other container structure having the data for network topology 520 may be displayed in interface 500b based on selections of options within network topology 502. Network topology 520 may correspond to data in interface 500b for entity enrichment details of a selected entity. The details of the selected entity may be displayed in a second pane within interface 520, such as the interface field or pane for entity enrichment details 532. This occurs when an entity is selected. The details enrich the map of the relations graph and network topology by providing a list of attributes for the selected entity. Entity enrichment details 532 can be attributes of a person or other entity, an explanation to the alert, activity of a bank account, a phone number of a party, and the like.

When viewing network topology 520, a user node 522 corresponds to the selected entity having entity enrichment details 532. Network topology 520 further shows four related entities to user node 522 based on connections, such as a first-time risk score alert 524, a periodic alert 526, a high-risk customer alert 528, and/or an address modification alert 530. Interface 500b further includes entity enrichment details 532 for user node 522, which may be queried from investigation server 120 when selecting user node 522 and returned in interface 500b. A timeline 534 of timestamps for the investigation timeline may also be displayed in interface 500b, which may allow for movement between data points and their corresponding timestamps. For example, a timestamp 536 is shown as selectable for a time when an alert was closed for a high-risk customer corresponding to user node 522.

Figure 5C:
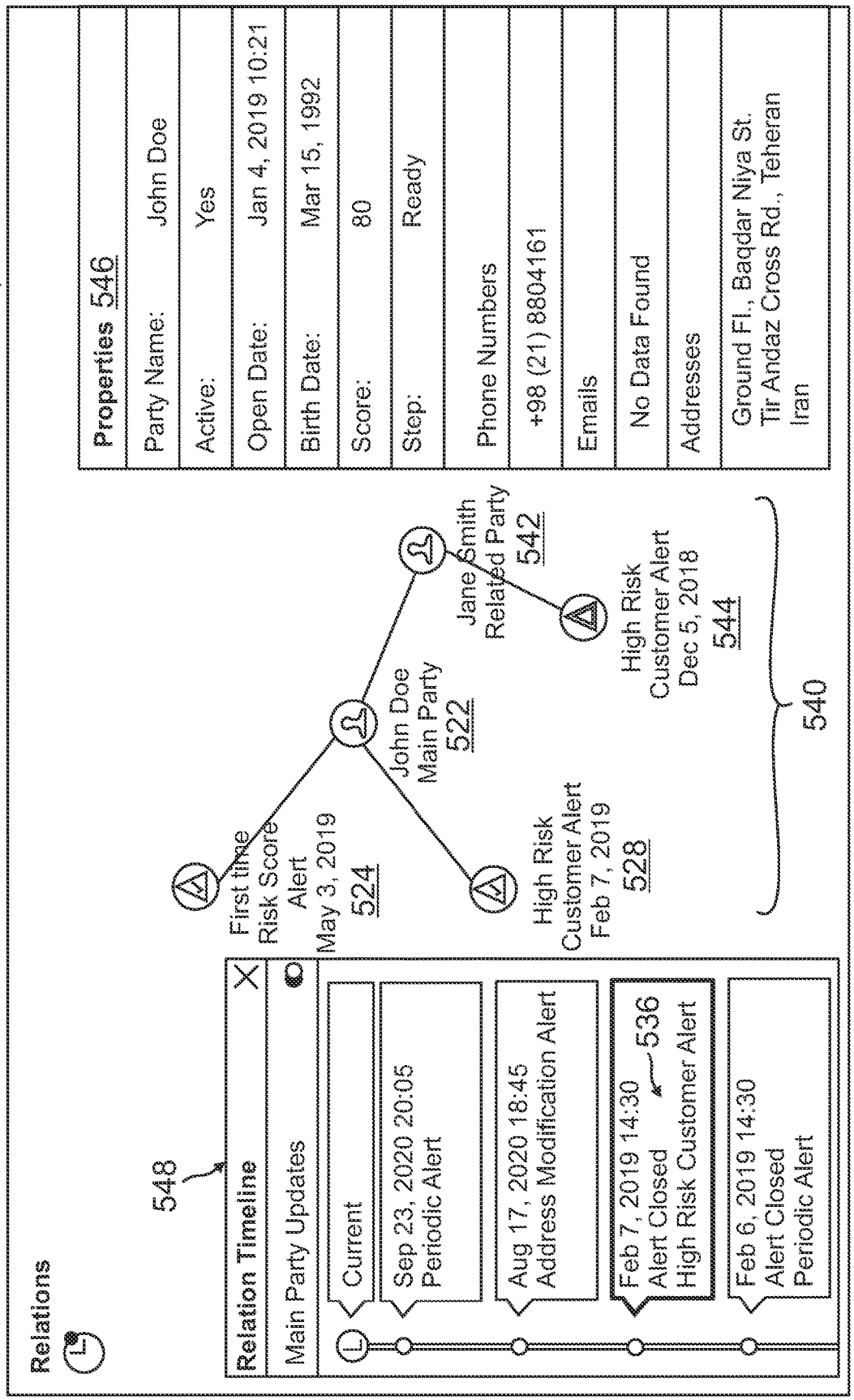
FIG. 5C is an exemplary user interface that shows an investigation timeline having a historical snapshot of an investigation object according to some embodiments.

FIG. 5C is an exemplary user interface that shows an investigation timeline having a historical snapshot of an investigation object according to some embodiments. Interface 500c of FIG. 5C may be displayed by a computing device during an investigation of an entity based on related entities and events that occur between those entities. Thus, interface 500c may be displayed by investigator device 110 when investigating an entity using investigation server 120.

Interface 500c displays a network topology 540 for an investigation timeline of an entity, which may be determined as described herein by investigation server 120. Network topology 540 may correspond to a change in a view of network topologies 502 and/or 520 from FIGS. 5A and/or 5B, respectively. In this regard, a received JSON structure or other container structure having the data for network topology 540 may be displayed in interface 500c based on selections of options within network topologies 502 and/or 520. Network topology 540 may correspond to data in interface 500c for a historical timeline snapshot based on a historically selected timestamp. For example, a third pane may display all or a subset of the timestamps for data points over a timeline 548. An investigator may move back and forth within the timestamps of the investigation using the third pane for timeline 548. The timestamps can span between the date that the party was onboarded to a financial institute up to the current time, however, other previous times may also be used. For example, an oldest available data point for an entity (e.g., with an external data source) may be a first data point and timestamp used, or a more recent point may be selected.

When viewing network topology 540 in interface 500c, timestamp 536 is shown as selected in timeline 548. A user node 522 corresponds to the selected entity having entity enrichment details 546 at a point in time for timestamp 536. Network topology 540 further shows three related entities to user node 522 based on connections at timestamp 536, such as first-time risk score alert 524 and/or an address modification alert 530. Interface 500c further includes a related user node 542 for a Jane Smith, which is related to user node 522 at the point in time for timestamp 536. Further, related user node 542 is shown with a related alert node 544 showing Jane Smith as having a high-risk customer alert. This allows for viewing of particular data for a point in time of the investigation. By selecting one of the timestamps, the relations diagram or graph for network topology 540 and the corresponding attributes may be adjusted accordingly. For example, a number of entities, the attributes of each entity, and the relations may vary between the snapshot based on the selected timestamp. When clicking on one of the timestamps, the user interface elements in the display may change to represent the selected time. By having access to the history of the investigation and of the relevant entities and their relations, a new relations graph is determined that provides insight to the investigation at the point in time for the timestamp.

Figure 6:
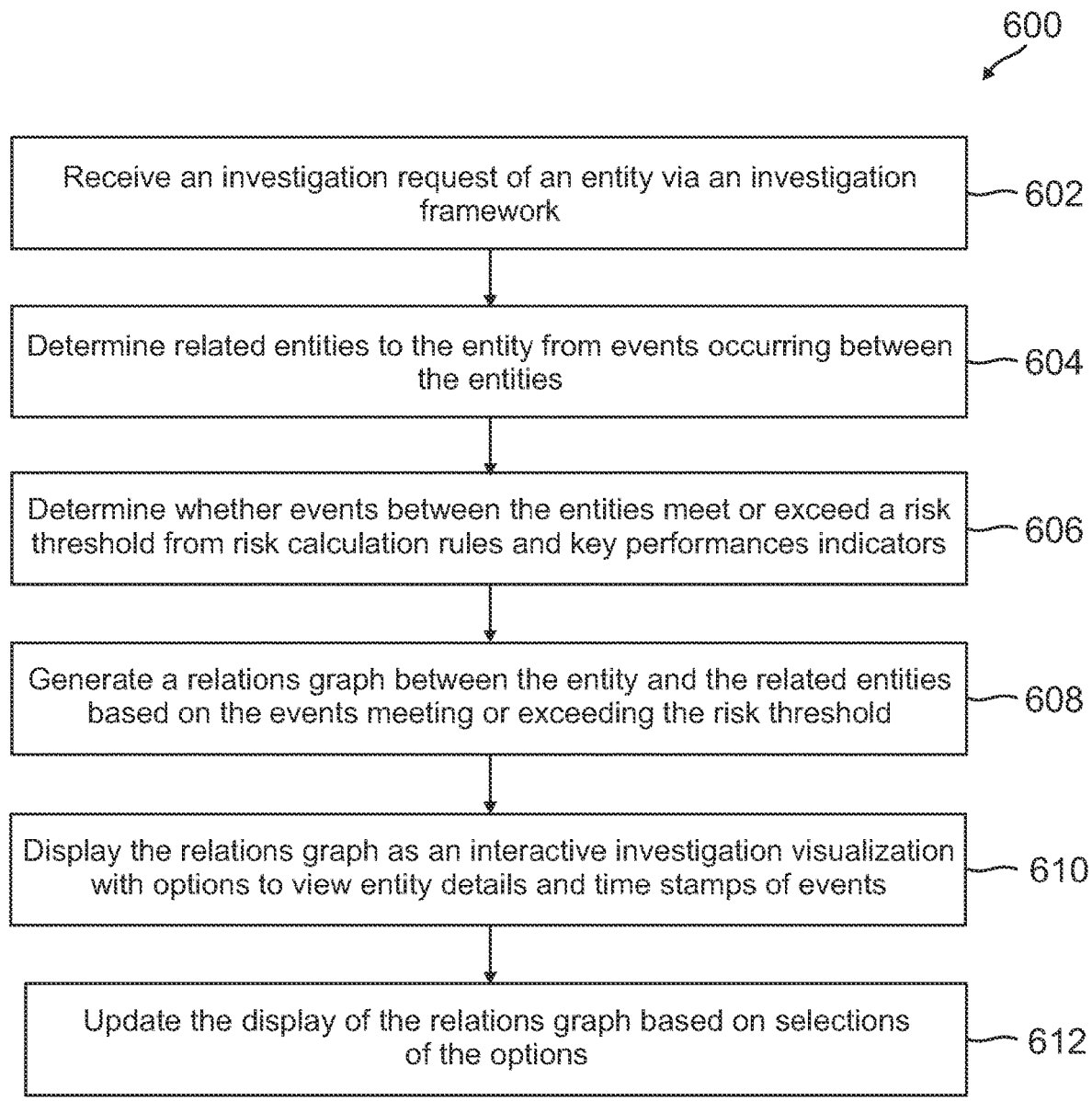
FIG. 6 is a simplified diagram of a method for dynamic entity data visualizations during an investigation of an entity according to some embodiments.

FIG. 6 is a simplified diagram of a method for dynamic entity data visualizations during an investigation of an entity according to some embodiments. Note that one or more steps, processes, and methods described herein of method 600 may be omitted, performed in a different sequence, or combined as desired or appropriate. In some embodiments, the generation and provision of an investigation timeline as a network topology of entities related by events occurring at points in time described in method 600 of FIG. 6 can be implemented and performed using investigation server 120. One or more of the processes 602-612 of method 600 may be implemented, at least in part, in the form of executable code stored on non-transitory, tangible, machine-readable media that when run by one or more processors may cause the one or more processors to perform one or more of the processes 602-612. In some embodiments, method 600 can be performed by one or more computing systems in environment 100 of FIG. 1.

At step 602 of method 600, an investigation request of an entity is received via an investigation framework, or system. The investigation request may correspond to identification of an entity that may have some attributes, as well as parameters of the investigation. For example, a starting date, ending date, related entities, or other information that may more specifically tailor an investigation may be received. However, the investigation may also be made broader if these parameters are unknown or not desired for the investigation. The investigation request may be received by a server of a service provider, including a cloud computing service and system, which may provide the framework, or system, via one or more user interfaces. At step 604, related entities to the entity from events occurring between the entities are determined. For example, internal and/or external data for the investigated entity and related entities (e.g., based on the attributes and the corresponding events and other data points over time) may be determined through one or more database queries and lookups.

At step 606, it is determined whether events between the entities meet or exceed a risk threshold from risk calculation rules and key performance indicators. For example, KPI values may be determined using risk and KPI calculation rules and the retrieved data for the investigation. Thereafter, the KPI rules are compared to individual and/or holistic risk thresholds to determine whether the data points for these events and entities meet or exceed the corresponding thresholds. If so, then the corresponding data point for the event and entity may be added to a list of interesting points in time for the investigation timeline, such as risk alerts in the investigation timeline. Using this data, at step 608, a relations graph between the entity and the related entities is generated based on those events meeting or exceeding the risk threshold. For example, the relations graph may correspond to a diagram or network topology that represents each entity as a node and connects entities based on events or relationships between those entities. Steps 604-608 are described in further detail with regard to flowchart 300 of FIG. 3 and corresponding KPI rule calculations from FIGS. 4A-4H.

The relations graph further includes one or more panes that allows for moving through timestamps and different points in time for the investigation. The panes allow for an investigator to select an interesting point in time and corresponding entity/event, which may cause the relations graph to change and be updated in the user interface displaying the relations graph. Further, another pane may provide for entity enrichment details, where additional information for an entity may be displayed in response to selection of the entity (e.g., name, address, account name/balance, transaction details, etc.). At step 610, the relations graph is displayed as an interactive investigation visualization with options to view entity details and timestamps of events, such as in the different panes of the interface. This may be output through a display component of a computing device. Using the available data, options, and selectable icons/fields of the visualization, at step 612, the display of the relations graph may be updated based on selections of the options. For example, an update or new relations graph may be determined, which may then be updated and/or displayed in the user interface. This allows for visualizing how an investigation changes over time based on different data at points in time.

As discussed above and further emphasized here, FIGS. 1, 2, 3, 4A-4H, 5, and 6 are merely examples of investigation server 120 and corresponding methods for performing entity investigations using dynamic data visualizations, which examples should not be used to unduly limit the scope of the claims. One of ordinary skill in the art would recognize many variations, alternatives, and modifications.

Figure 7:
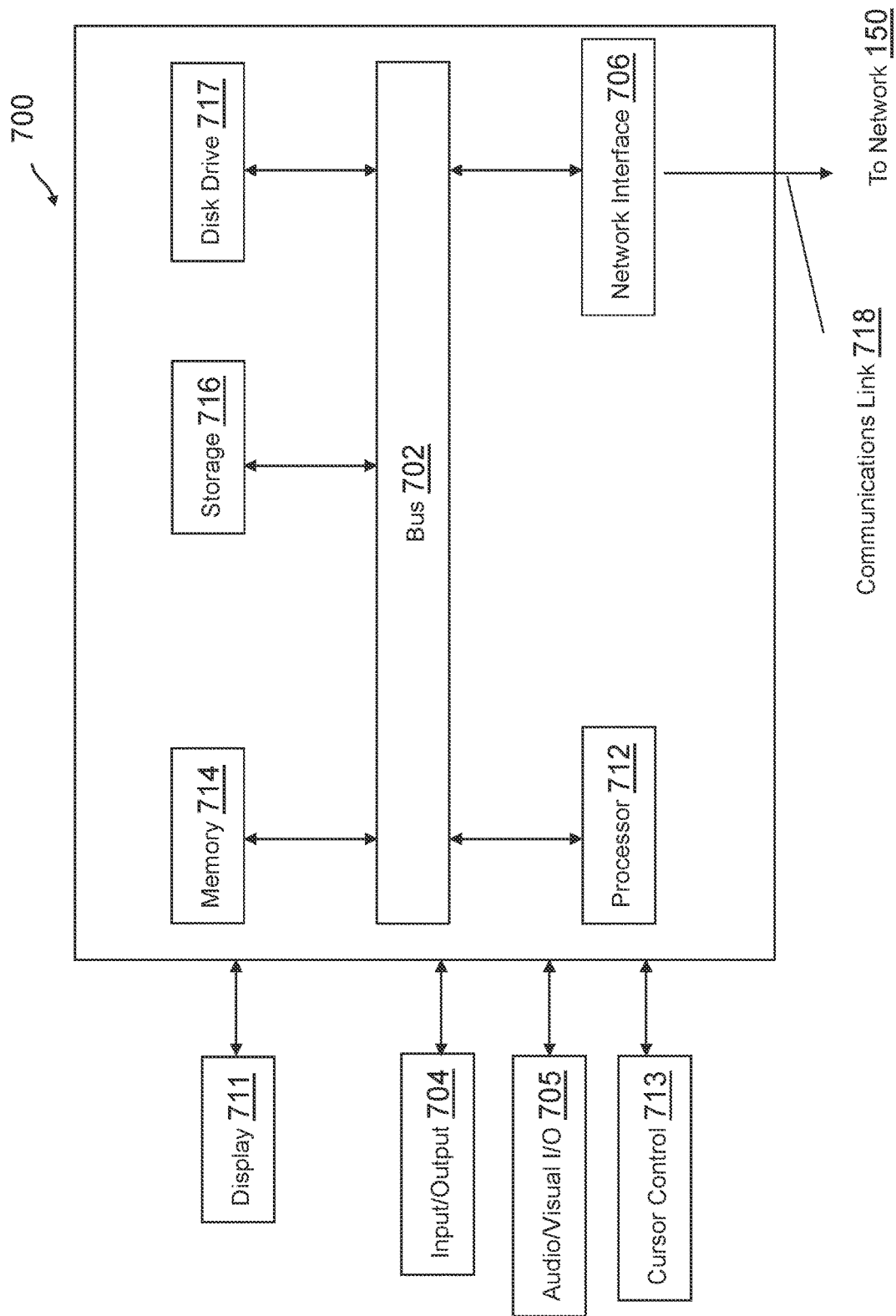
FIG. 7 is a simplified diagram of a computing device according to some embodiments.

FIG. 7 is a block diagram of a computer system suitable for implementing one or more components in FIGS. 1 and 2, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, images, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 150. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A data investigation system configured to provide optimized data viewing for investigations using a network topology of relations between entities, the data investigation system comprising:
    a processor and a computer readable medium operably coupled thereto, the computer readable medium comprising a plurality of instructions stored in association therewith that are accessible to, and executable by, the processor, to perform investigation mapping operations which comprise:
        receiving, from a computing device, an investigation of a first entity using the data investigation system, wherein the first entity comprises a first set of attributes that caused the investigation thereof;
        determining, based on the first set of attributes, a plurality of related entities associated with a plurality of events each occurring between the first entity and the plurality of related entities at a respective time;
        determining, based on a set of risk calculation rules and a plurality of key performance indicators (KPIs) associated with the investigation, whether each of the plurality of events occurring at the respective time meets or exceeds a risk threshold for the investigation of the first entity;
        generating, based on determining whether each of the plurality of events occurring at the respective time meets or exceeds the risk threshold, a first relations graph of the first entity to one or more of the plurality of related entities, wherein the first entity and the one or more of the plurality of related entities determined based on one or more of the plurality of events meeting or exceeding the risk threshold are represented as nodes on the network topology of the first relations graph;
        displaying, on the computing device via a first user interface of a relations widget of the data investigation system, the first relations graph;
        displaying, on the computing device via a second user interface of the relations widget, a plurality of timestamps associated with the plurality of events, wherein the second user interface comprises a tool to move between the plurality of timestamps from an initial onboarding time of the first entity to a current time;
        receiving a selection of one of the plurality of timestamps from the second user interface;
        generating a second relations graph in the first user interface based on a subset of the plurality of events that occur prior to or at the one of the plurality of timestamps, wherein the subset of the plurality of events meets or exceeds the risk threshold; and
        updating, on the computing device via the first user interface of the relations widget of the data investigation system, the first relations graph to the second relations graph.

2. The data investigation system of claim 1, wherein the investigation mapping operations further comprise:
    receiving a selection of one of the plurality of related entities from the first relations graph in the first user interface;
    fetching a second set of attributes associated with the one of the plurality of related entities, a corresponding one of the plurality of events between the first entity and the one of the plurality of related entities, or both; and
    displaying, on the computing device via a second user interface of the relations widget, the second set of attributes, the corresponding one of the plurality of events, or both.

3. The data investigation system of claim 1, wherein the investigation mapping operations further comprise:
    displaying, on the computing device via the second user interface of the relations widget, event information, entity information, or both that causes each of the plurality of events to meet or exceed the risk threshold at the respective time.

4. The data investigation system of claim 1, wherein determining whether each of the plurality of events meets or exceeds the risk threshold comprises:
- iteratively processing each of the plurality of KPIs in a successive order using the set of risk calculation rules, the plurality of related entities, and the plurality of events;
- during iteratively processing each of the plurality of KPIs, determining an overall calculated KPI value based on processed ones of the plurality of KPIs; and
- comparing the overall calculated KPI value to the risk threshold.

5. The data investigation system of claim 1, wherein, before determining whether each of the plurality of events meets or exceeds the risk threshold, the investigation mapping operations further comprise:
- determining a defined KPI set comprising the plurality of KPIs for the investigation; and
- determining a relative weight for each of the plurality of KPIs with the set of risk calculation rules,
- and wherein determining whether each of the plurality of events meets or exceeds the risk threshold comprises:
- determining an event risk score for each of the plurality of events based on the plurality of KPIs and the relative weight for each of the plurality of KPIs with the set of risk calculation rules; and
- comparing the event risk score to the risk threshold.

6. The data investigation system of claim 1, wherein the plurality of KPIs comprise at least one of an issue escalation count KPI, a Suspicious Activity Report (SAR) KPI, a suspicious information modification KPI, a related entity risk KPI, an entity risk increase KPI, a projected network topology risk score KPI, a network topology escalation distance KPI, a divergence in transaction volume KPI, or any combination of the foregoing.

7. A method to provide optimized data viewing for investigations using a network topology of relations between entities using a data investigation system, the method comprising:
- receiving, from a computing device, an investigation of a first entity using the data investigation system, wherein the first entity comprises a first set of attributes that caused the investigation thereof;
- determining, based on the first set of attributes, a plurality of related entities associated with a plurality of events each occurring between the first entity and the plurality of related entities at a respective time;
- determining, based on a set of risk calculation rules and a plurality of key performance indicators (KPIs) associated with the investigation, whether each of the plurality of events occurring at the respective time meets or exceeds a risk threshold for the investigation of the first entity;
- generating, based on determining whether each of the plurality of events occurring at the respective time meets or exceeds the risk threshold, a first relations graph of the first entity to one or more of the plurality of related entities, wherein the first entity and the one or more of the plurality of related entities determined based on one or more of the plurality of events meeting or exceeding the risk threshold are represented as nodes on the network topology of the first relations graph;
- displaying, on the computing device via a first user interface of a relations widget of the data investigation system, the first relations graph;
- displaying, on the computing device via a second user interface of the relations widget, a plurality of timestamps associated with the plurality of events, wherein the second user interface comprises a tool to move between the plurality of timestamps from an initial onboarding time of the first entity to a current time;
- receiving a selection of one of the plurality of timestamps from the second user interface;
- generating a second relations graph in the first user interface based on a subset of the plurality of events that occur prior to or at the one of the plurality of timestamps, wherein the subset of the plurality of events meets or exceeds the risk threshold; and
- updating, on the computing device via the first user interface of the relations widget of the data investigation system, the first relations graph to the second relations graph.

8. The method of claim 7, further comprising:
- receiving a selection of one of the plurality of related entities from the first relations graph in the first user interface;
- fetching a second set of attributes associated with the one of the plurality of related entities, a corresponding one of the plurality of events between the first entity and the one of the plurality of related entities, or both; and
- displaying, on the computing device via a second user interface of the relations widget, the second set of attributes, the corresponding one of the plurality of events, or both.

9. The method of claim 7, further comprising:
- displaying, on the computing device via the second user interface of the relations widget, event information, entity information, or both that causes each of the plurality of events to meet or exceed the risk threshold at the respective time.

10. The method of claim 7, wherein determining whether each of the plurality of events meets or exceeds the risk threshold comprises:
- iteratively processing each of the plurality of KPIs in a successive order using the set of risk calculation rules, the plurality of related entities, and the plurality of events;
- during iteratively processing each of the plurality of KPIs, determining an overall calculated KPI value based on processed ones of the plurality of KPIs; and
- comparing the overall calculated KPI value to the risk threshold.

11. The method of claim 7, wherein, before determining whether each of the plurality of events meets or exceeds the risk threshold, the method further comprises:
- determining a defined KPI set comprising the plurality of KPIs for the investigation; and
- determining a relative weight for each of the plurality of KPIs with the set of risk calculation rules,
- and wherein determining whether each of the plurality of events meets or exceeds the risk threshold comprises:
- determining an event risk score for each of the plurality of events based on the plurality of KPIs and the relative weight for each of the plurality of KPIs with the set of risk calculation rules; and
- comparing the event risk score to the risk threshold.

12. The method of claim 7, wherein the plurality of KPIs comprise at least one of an issue escalation count KPI, a Suspicious Activity Report (SAR) KPI, a suspicious information modification KPI, a related entity risk KPI, an entity risk increase KPI, a projected network topology risk score KPI, a network topology escalation distance KPI, a divergence in transaction volume KPI, or any combination of the foregoing.

13. A non-transitory computer-readable medium having stored thereon computer-readable instructions executable to provide optimized data viewing for investigations using a network topology of relations between entities using a data investigation system, the computer-readable instructions executable to perform investigation mapping operations which comprises:
- receiving, from a computing device, an investigation of a first entity using the data investigation system, wherein the first entity comprises a first set of attributes that caused the investigation thereof;
- determining, based on the first set of attributes, a plurality of related entities associated with a plurality of events each occurring between the first entity and the plurality of related entities at a respective time;
- determining, based on a set of risk calculation rules and a plurality of key performance indicators (KPIs) associated with the investigation, whether each of the plurality of events occurring at the respective time meets or exceeds a risk threshold for the investigation of the first entity;
- generating, based on determining whether each of the plurality of events occurring at the respective time meets or exceeds the risk threshold, a first relations graph of the first entity to one or more of the plurality of related entities, wherein the first entity and the one or more of the plurality of related entities determined based on one or more of the plurality of events meeting or exceeding the risk threshold are represented as nodes on the network topology of the first relations graph;
- displaying, on the computing device via a first user interface of a relations widget of the data investigation system, the first relations graph;
- displaying, on the computing device via a second user interface of the relations widget, a plurality of timestamps associated with the plurality of events, wherein the second user interface comprises a tool to move between the plurality of timestamps from an initial onboarding time of the first entity to a current time;
- receiving a selection of one of the plurality of timestamps from the second user interface;
- generating a second relations graph in the first user interface based on a subset of the plurality of events that occur prior to or at the one of the plurality of timestamps, wherein the subset of the plurality of events meets or exceeds the risk threshold; and
- updating, on the computing device via the first user interface of the relations widget of the data investigation system, the first relations graph to the second relations graph.

14. The non-transitory computer-readable medium of claim 13, wherein the investigation mapping operations further comprise:
- receiving a selection of one of the plurality of related entities from the first relations graph in the first user interface;
- fetching a second set of attributes associated with the one of the plurality of related entities, a corresponding one of the plurality of events between the first entity and the one of the plurality of related entities, or both; and
- displaying, on the computing device via a second user interface of the relations widget, the second set of attributes, the corresponding one of the plurality of events, or both.

\* \* \* \* \*